(12) United States Patent
Nehmadi et al.

(10) Patent No.: US 11,668,830 B1
(45) Date of Patent: Jun. 6, 2023

(54) SYSTEM AND METHOD FOR PERFORMING ACTIVE DISTANCE MEASUREMENTS

(71) Applicant: VAYAVISION SENSING LTD., Or Yehuda (IL)

(72) Inventors: Youval Nehmadi, Nili (IL); Ronny Cohen, Ramat HaSharon (IL); Shmuel Mangan, Nes Ziona (IL); Zvi Nezer, Raanana (IL); Moshe Langer, Nes Ziona (IL)

(73) Assignee: VayaVision Sensing Ltd., Or Yehuda (IL)

( * ) Notice: Subject to any disclaimer, the term of this patent is extended or adjusted under 35 U.S.C. 154(b) by 1044 days.

(21) Appl. No.: 16/423,287

(22) Filed: May 28, 2019

Related U.S. Application Data

(60) Provisional application No. 62/679,043, filed on Jun. 1, 2018.

(51) Int. Cl.
| | |
|---|---|
| *G01S 17/89* | (2020.01) |
| *G01S 7/4865* | (2020.01) |
| *G01S 17/10* | (2020.01) |
| *G01S 7/481* | (2006.01) |
| *G06V 20/56* | (2022.01) |
| *G05D 1/02* | (2020.01) |

(52) U.S. Cl.
CPC ............ *G01S 17/89* (2013.01); *G01S 7/4817* (2013.01); *G01S 7/4865* (2013.01); *G01S 17/10* (2013.01); *G06V 20/56* (2022.01); *G05D 1/0231* (2013.01); *G05D 2201/0213* (2013.01)

(58) Field of Classification Search
None
See application file for complete search history.

(56) References Cited

U.S. PATENT DOCUMENTS

| | | |
|---|---|---|
| RE46,930 E | 7/2018 | Mimeault |
| RE47,134 E | 11/2018 | Mimeault |
| 10,444,357 B2 | 10/2019 | Nehmadi et al. |
| RE48,763 E | 10/2021 | Mimeault |
| 11,226,413 B2 | 1/2022 | Nehmadi et al. |
| RE48,914 E | 2/2022 | Mimeault et al. |
| 11,292,483 B2 | 4/2022 | Nehmadi et al. |
| 11,402,510 B2 | 8/2022 | Baribault |
| 2016/0291154 A1 | 10/2016 | Nehmadi et al. |
| 2016/0291155 A1 | 10/2016 | Nehmadi et al. |
| 2017/0273161 A1* | 9/2017 | Nakamura ............ G01S 7/4817 |
| 2018/0306925 A1* | 10/2018 | Hosseini ................. G01S 17/42 |

(Continued)

*Primary Examiner* — Eileen M Adams
(74) *Attorney, Agent, or Firm* — Fish & Richardson P.C.

(57) ABSTRACT

A method for performing active distance measurements, the method may include receiving or generating an identification of at least one target object recognized in an image; emitting, by a transmission module, one or more light pulses towards the at least one target object; directing, by an optical multiplexer of a reception module, towards at least one detector, at least one reflected light pulse that is reflected from the at least one target object; detecting, by at least one detector of the reception module, the at least one reflected light pulse; dynamically coupling, by an electrical multiplexer, the at least one detector to at least one distance measurement unit; calculating, by the one or more distance measurement units, a distance to each one of the at least one target object based on the at least one emitted light pulse and the at least one reflected light pulse.

39 Claims, 23 Drawing Sheets

(56) References Cited

U.S. PATENT DOCUMENTS

| | | |
|---|---|---|
| 2020/0062273 A1 | 2/2020 | Nehmadi et al. |
| 2021/0080575 A1 | 3/2021 | Nehmadi et al. |
| 2021/0129868 A1 | 5/2021 | Nehmadi |
| 2021/0293963 A1 | 9/2021 | Nehmadi et al. |
| 2022/0026539 A1 | 1/2022 | Bernier et al. |
| 2022/0026540 A1 | 1/2022 | Olivier |
| 2022/0026573 A1 | 1/2022 | Baribault et al. |
| 2022/0026576 A1 | 1/2022 | Baribault et al. |
| 2022/0137214 A1 | 5/2022 | Nehmadi et al. |
| 2022/0229190 A1 | 7/2022 | Nehmadi et al. |

\* cited by examiner

SYSTEM AND METHOD FOR PERFORMING ACTIVE DISTANCE MEASUREMENTS

BACKGROUND

An autonomous car (also known as a driverless car, self-driving car, or robotic car) is a vehicle that navigates without human control. An autonomous vehicle senses its environment to detect surroundings using radar, Lidar, GPS, Odometer, or computer vision. Advanced control systems interpret sensory information to identify appropriate navigation paths, as well as obstacles and relevant signage. Autonomous cars are equipped with control systems for analyzing sensory data in order to distinguish between different cars or obstacles on the road. Currently, driverless technology is developed by Google®, Tesla®, and some other vehicles manufactures, such as Audi®, BMW®, Nissan®, and the like.

Other companies such as, e.g., Mobileye®, are in the marketplace trying to provide solutions for hands-free driving technology. Use of this technology is typically limited to particular driving infrastructures such as, e.g., highways or country roads. The corner-stone of such hands-free driving and autonomous vehicles technologies is the rendering or generation of a 3-dimensional (3D) map of a scene at any given moment during or immediately prior to motion. Such a map tries to mimic a scene as would have been seen by a driver.

In addition, other technologies utilize 3D maps for, e.g., navigational purposes. Drones and other vehicles may utilize 3D maps at least in part to control movements. Further, virtual games and/or movies may be controlled via user input with respect to a 3D map.

The rendering of such 3D-maps is typically accomplished by measuring distances to many points in the 3D space to determine the existence of objects and their respective distances from the vehicle. The rendered 3D-maps may be combined and processed to produce driving decisions by the vehicle. Existing solutions for rendering detailed 3D-maps are based on LiDar (or LADAR) systems. A LiDar system measures distance to an object by illuminating multiple targets (points in the space) with one laser beam or multiple laser beams. Such existing solutions configure the LiDar system to scan the entire environment (scene). This requires a large number of laser measurements to render a single 3D-map.

For example, FIG. 1 shows an image 100 of a scene for which a 3D-map is generated. Some existing solutions implemented by hands-free and autonomous driving technologies measure the distance to each point 110 in the image 100. Thus, a laser beam illuminates each such point to render the 3D-map. In many examples, the LiDar system does not have any prior knowledge of the scene, e.g., a picture of the scene. To this aim, such technologies are based on very complex and expensive equipment. For example, a robotic car made by Google® includes equipment with a LiDar system worth about $70,000. The LiDar system includes a 64-beam laser. Due to the high cost of the hardware for rendering the 3D-maps, mass production of autonomous vehicles is not feasible. It should be noted that only a few points 110 are specifically labeled in FIG. 1 merely for simplicity purposes.

In addition, widespread production of the autonomous vehicle using existing Lidar systems would create hazardous conditions to pedestrians, drivers and/or passengers because of the high number of laser beams that would be transmitted from each vehicle and would likely hit a person in the line of sight. Further, the existing LiDar solutions are configured to transmit laser beams at the highest available energy level. This is performed to measure a point at a maximum range of the Lidar system.

Moreover, the generation of 3D-maps by scanning the entire scene will increase the crosstalk. This is due to the high number of laser beams being transmitted by autonomous vehicles equipped with such scanning systems. As a result, the resulting resolution of 3D-maps generated by scanning the entire scene may be limited.

Further, some existing solutions are configured to transmit pulses of light at the highest available energy for each distance being measured. However, the amount of energy actually needed to accurately determine the distance to an object may vary based on the method utilized to determine distance, the resolution required, the material of the object (e.g., color of the material), the angle of the object relative to the source of light, and the distance to the object. Thus, use of only laser beams having the highest available energy frequently results in using higher energy levels than may be required. This unnecessarily wastes energy and increases the risk of harm to people occupying areas in which laser-based and similar measurements are performed.

It would therefore be advantageous to provide a solution for generating 3D-maps that would overcome the deficiencies of the prior art.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" may be used herein to refer to a single embodiment or multiple embodiments of the disclosure.

There are provided systems, methods, as illustrated in the claims and the specification.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

DETAILED DESCRIPTION OF THE DRAWINGS

Figure 1:
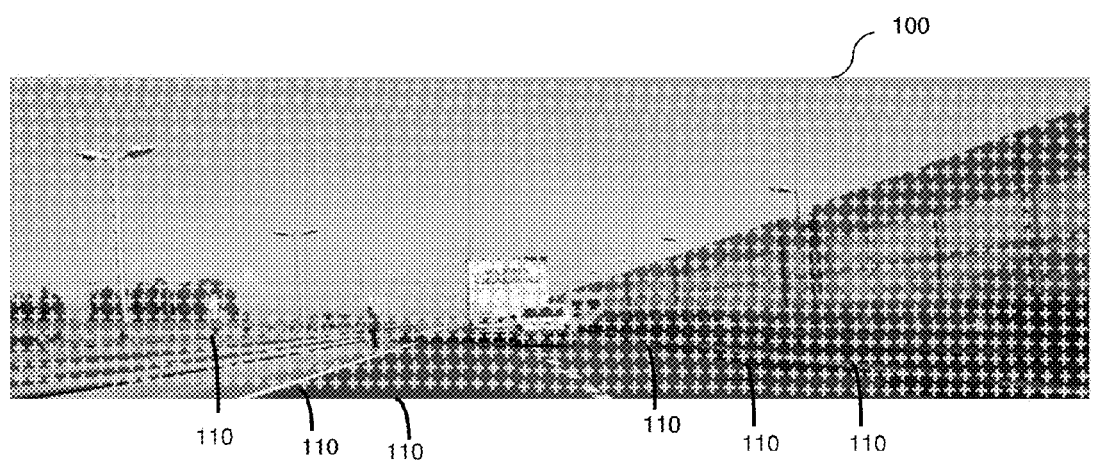
FIG. 1 is a picture of a scene for which a 3D-map is generated using a conventional approach.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a system capable of executing the method and should be applied mutatis mutandis to a non-transitory computer readable medium that stores instructions that once executed by a computer result in the execution of the method.

Any reference in the specification to a system and any other component should be applied mutatis mutandis to a method that may be executed by the memory device and should be applied mutatis mutandis to a non-transitory computer readable medium that stores instructions that may be executed by the memory device.

Any reference in the specification to a non-transitory computer readable medium should be applied mutatis mutandis to a system capable of executing the instructions stored in the non-transitory computer readable medium and should be applied mutatis mutandis to method that may be executed by a computer that reads the instructions stored in the non-transitory computer readable medium.

Any combination of any module or unit listed in any of the figures, any part of the specification and/or any claims may be provided. Especially any combination of any claimed feature may be provided.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

According to the disclosed embodiments, 3D-maps are rendered or otherwise generated based on active measurements, passive measurements, and/or analysis of information related to such measurements. In some embodiments, the 3D-maps may be based on measurements captured from a vehicle. In an embodiment, active measurements are laser measurements, while passive measurements are achieved by image processing. Therefore, the disclosed embodiments allow for provision of a complete 3D-map of a scene while using a small number of low-energy laser beams. In certain configurations, the disclosed embodiments can be utilized to generate a high-resolution 3D-map of certain sections of the environments without performing active measurements for the entire scene. The utilization of a few active measurements reduces the risk of human exposure to laser beams. In some embodiments, the scene may be a field of view captured simultaneously by an apparatus for causing generation of the 3D-map.

Figure 2:
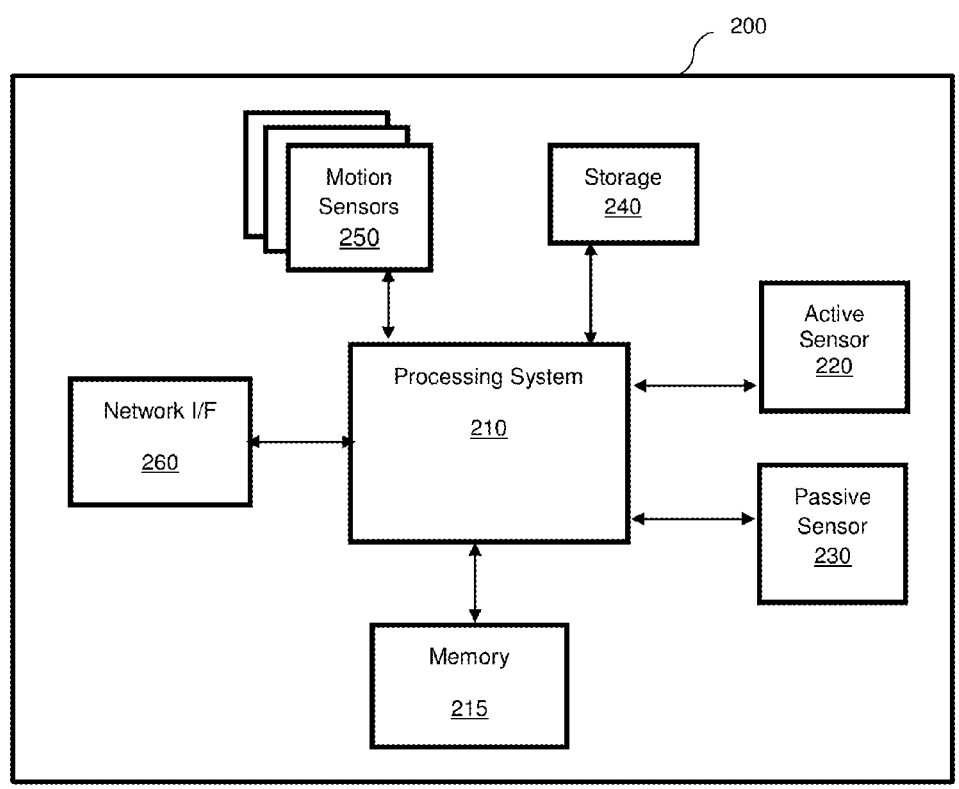
FIG. 2 is a block diagram of an apparatus configured to generate 3D-maps from a vehicle according to one embodiment.

FIG. 2 shows an example block diagram of an apparatus 200 configured to generate 3D-maps from a vehicle according to one embodiment. The apparatus 200 includes a memory 215, and an active sensor 220 connected to the processing system 210. In certain configurations, the apparatus 200 further includes a passive sensor 230, a storage 240, one or more motion sensors 250, and a network interface 260 connected to the processing system 210.

The apparatus 200 can be, e.g., mounted on or integrated in a vehicle and/or camera. Such a vehicle may include, for example, a car, a truck, a bus, a drone, a robot, and the like. The camera may be, but is not limited to, a camera utilized to capture video for 3D movies. The apparatus 200 can be utilized to generate 3D-maps of the scene as would be observed by an operator (e.g., a driver) of the vehicle. In an embodiment, the apparatus 200 is configured to control part or all of the operation of the vehicle based on analysis of the generated 3D-maps. Therefore, the apparatus 200 can be utilized in applications related to autonomous vehicles, hands-free driving systems, driver assistance systems, and the like.

The passive sensor 230 may be an image sensor (e.g., a camera) configured to passively acquire images. The acquired images can be processed by processing system 210 or by the passive sensor 230 using image processing techniques.

The active sensor 220 is configured to perform active measurements in specific directions to determine the distance from objects in the scene. In an embodiment, the active measurements are laser measurements. In a further embodiment, the active sensor 220 is configured to illuminate light beams in specific directions (determined by, e.g., the processing system 210) and to detect the light beams reflected off of objects in the scene. The distance from an object can be computed based on the energy and reflection angle of each reflected light beam. The active sensor 220 can be realized as, but not limited to, an active stereovision, a structured light, a time-of-flight (TOF), and the like.

In yet a further embodiment, the active sensor 220 is configured to determine and utilize optimized active measurements. To this end, the active sensor 220 may be configured to control energy levels for active measurements. The optimized active measurement energy levels may be determined based on previously known distances to objects in a scene. The previously known distances may be based on for example, previous active and/or passive measurements, known positions of objects in the scene, and the like. The determined energy levels may be set based on parameters such as, but not limited to, pulse length, power, and/or height. Thus, an energy level may be lower than another energy level if, for example, the pulse length, power, and/or height is lower.

In an embodiment, if a return signal for an active measurement sent in a direction by the active sensor 220 cannot be measured, the energy level for active measurements in that direction may be increased and subsequent active measurements may be utilized until a return signal can be measured. Active measurements for the direction may be further adjusted to optimize energy levels. Optimizing active measurements with respect to energy levels of the active measurements allows for reduced energy consumption and harm to objects in the scene.

In another embodiment, determining the optimized active measurements may further include determining an optimal path between locations in the scene for which a plurality of active measurements will be taken. The optimal path may be utilized to reduce time and energy utilized to change direction of the active emissions when performing multiple active measurements. The plurality of active measurements may be performed by, e.g., utilizing one or more mirrors or MEMS mirrors to capture return signals based on active emissions and moving the mirrors or MEMS mirrors based on the directions of the active emissions.

The optimal path may be determined based on, but not limited to, a time for changing the direction of the active emission from a first direction to a second direction, movements (direction, speed, acceleration, etc.) of the apparatus 200 and/or of mirrors or MEMS mirrors, a minimum time needed between measurements (e.g., 2 microseconds), and the like. The minimum time needed between active measurements may be further based on, e.g., a maximum range for objects in the scene. The optimal path may be determined such that the time between active measurements is minimized.

The processing system 210 is configured to process data (e.g., energy level, direction, reflection angle of the emitted and reflected beam) in order to generate a 3D-map of the entire environment or of certain objects in the environment. As will be discussed below, the number of active measurements is limited to certain points and/or surfaces in the space as the initial scanning is performed using the image or images acquired by the passive sensors 230. In an embodiment, to create the 3D-map additional information, such as previously acquired images or previously generated 3D-maps, previously determined active measurements and/or sensory information be gathered from the motion sensors 250 may be utilized. The motion sensors 250 may include, but are not limited to, a global positioning system (GPS), an accelerometer, a proximity sensor, an odometer, and the like. The additional information together with the active/passive measurements can be utilized by the processing system 210 to determine a size of each object, its speed, and its direction relative to the vehicle.

According to certain embodiments, the processing system 210 is configured to generate 3D maps. To this end, the processing system 210 may be configured to fuse active and passive measurements; determine stationary or nearly stationary objects; actively measure the distance only from moving objects; and estimate distance from objects using the top possible velocity of objects and/or using passive measurements.

The fusion of active and passive measurements may include utilizing the active sensor 220 to measure objects in areas where the passive sensor 230 does not provide a reliable measurement. Whether the passive sensor 230 can provide a reliable measurement for an object may be based on, but not limited to, a classification of the object, a visibility of the object in the image, and the like. In an embodiment, if a reliable passive measurement can be achieved, the active sensor 220 is not utilized. Thus, the disclosed embodiments may significantly reduce the number of active measurements performed by the active sensor 220.

As such, fewer laser beams or other sources may be utilized, thereby reducing energy consumption, crosstalk, and hazardous conditions, as well as achieving higher resolution. In an embodiment, the apparatus 200 can be configured such that only suspicious objects will be actively measured using the active sensor 220. A suspicious object may be any object that requires active measurement to accurately generate a map based thereon. The classification of objects are discussed below. An object may be suspicious if, e.g., the object is non-stationary (i.e., moving) and/or in close-proximity to the apparatus 200. As an example, if the apparatus 200 is mounted on a car, pedestrians will be considered as suspicious objects while trees in the background are not.

In an embodiment, the processing system 210 is configured to determine which object is stationary or near stationary based on images provided by the passive sensor 230. For example, using image recognition, the processing system 210 may be configured to determine stationary objects such as, e.g., a house, a tree, a pole, etc. In a further embodiment, when the passive sensor 230 is fixed, the processing system 210 may be configured to determine if an object is stationary by comparing two consecutive images and determining which objects have been moved relative to stationary objects, based on the comparison. As an example, if the passive sensor is fixed to the side of a building in an environment, consecutive images may be compared to determine whether any objects in the scene have been moved relative to stationary objects. In an embodiment, when the passive sensor 230 is in motion, the distance from stationary objects can be measured using GPS and the speed of the car.

In yet a further embodiment, determining whether objects are stationary may be based on comparisons of frames (e.g., images) captured by the passive sensor 230. The comparisons may include, but are not limited to, determining changes in distances between sets of points in the frames. In an example embodiment, each distance change between two points may be equal to a difference between the 3D distance between the points as seen in a first frame with the 3D distance between the points as seen in a second frame. Any object that is determined to have moved may be associated with a non-stationary object. In an embodiment, an object may be determined to have moved if, for example, a sum of all distance changes related to the object is above a predefined threshold. In another embodiment, an object may be determined to have moved if the sum of distance changes related to the point is greater than the sum of distance changes related to each of the other objects above a predefined threshold. In yet another embodiment, an object may be determined to have moved if a distance change related to an object in a subsequent frame is greater than a distance change related to the object in a prior frame above a predefined threshold.

In another embodiment, determining whether objects in images are stationary may be based on predicted locations of objects in an image. A prediction image may be generated based on a frame of a currently acquired image or generated 3D-map. The prediction image may be further based on a movement of the sensor acquiring the current image or providing information used to generate the current 3D-map. Based on the current frame and/or any new position or orientation of the sensor, a prediction frame illustrating predicted positions of the objects at a subsequent time (assuming the objects do not move) is generated. The prediction frame may be compared to a subsequent frame based on sensor readings at the subsequent time to determine if there are any differences between locations of the objects. In an embodiment, if a difference in location of an object between the prediction frame and a corresponding subsequent frame is above a predefined threshold, it may be determined that the object has moved.

In an embodiment, when the passive sensor 230 is in motion, the distance from stationary objects can be measured using GPS and the speed of the car. In another embodiment, the distance from stationary objects can be measured without using GPS by comparing frames (e.g., acquired images) of passive sensor information and/or 3D mapping information. In a further embodiment, finding the distance and/or angle change between any two frames may be determined, for each pair of corresponding points in the frames, based on a weighted score. To this end, in an embodiment, finding the distance or angle change between two frames may further include determining matching or otherwise corresponding points in the frames. In yet a further embodiment, the weighted score may be based on, but not limited to, a degree of error associated with the distance of the point in each frame such as, e.g., error based on noise.

In a further embodiment, a prediction frame may be generated based on 3D or 2D mapping information as well as a location and orientation of a sensor. The prediction frame may be a 3D image illustrating predicted positions of stationary (i.e., non-moving) objects included in the 3D-mapping information. Such stationary objects may include, but are not limited to, trees, billboards, signs, buildings, and other permanent or semi-permanent items or fixtures. The prediction frame may be utilized to, e.g., fill in exposed gaps of a previous frame (for example, when an object moves, the prediction frame may be utilized to illustrate a prediction for items behind the previous location of the moved object).

In another embodiment, the passive measurements may be performed based on movements of objects classified as non-stationary and non-suspicious. To this end, passively measuring the distance may include, but is not limited to, determining a boundary speed of the object and a direction of movement of the object. The boundary speed is a speed at which the boundary (i.e., outer surface) of the object is traveling. Based on the determined boundary speed and direction, a distance to the object may be estimated. In an embodiment, the estimated distance may be further based on a previously known distance to the object and/or previously generated 3D-maps including the object. Selectively passively measuring distances to objects based on classifications and previously known distances allows for decreased numbers of active measurements, thereby reducing energy consumption and harmful effects on objects in the environment.

In a further embodiment, the processing system 210 is configured to estimate the distance from non-stationary objects using a maximum and/or minimum possible speed of such objects. The maximum or minimum possible speed of an object may be utilized as the boundary speed. For example, if a distance from a pedestrian is first measured, then the distance range (e.g., between 0 and 2 meters) representing possible distances of that pedestrian at a given time can be determined based on a predetermined maximum velocity of a person. The estimation allows for more reliable passive measurements on moving objects, thereby allowing for further reduced usage of active measurements and, as a result, lower energy consumption.

In yet another embodiment, the processing system 210 is configured to selectively utilize active measurements for objects based on the presence or absence of edges and/or patterns. Accordingly, objects having clear edges or patterns (e.g., objects having edges or patterns shown in images with clarity above a predefined threshold) may be classified as such. In an embodiment, the distances to objects having clear edges or patterns may be determined via passive measurements, while objects not having clear edges or patterns may be determined via active measurements. In a further embodiment, if an object has clear edges and patterns but its distance cannot be estimated via passive measurement, active measurement may be performed on the object.

As a non-limiting example, the processing system 210 may be configured to utilize stereovision for smaller objects (i.e., objects having a size in pixels of an image below a predefined threshold) and for objects having clear edges. An image including traffic signs, poles, lampposts, a vehicle, and a road is captured by the passive sensor 230. It is determined that edges of the traffic signs, poles, lampposts, and the sides of the vehicle have clear edges. Accordingly, stereovision is used to determine the distance to each of these clear edge objects based on the captured image. It is determined that the other portions of the car and the road are both above the predefined threshold and lack clear edges; accordingly, distances to such objects lacking clear edges are actively determined.

The processing system 210 will not trigger another active measurement with respect to the pedestrian if the pedestrian is located within a range that does not require any action (e.g., walking in a sidewalk across the street from the vehicle). An action may include, for example, controlling the vehicle. Whether an action is required may be based on a predefined safe distance threshold. The safe distance threshold may include, but is not limited to, the speed of the vehicle and/or object, the distance of the object from the apparatus 200, a type of the object, combinations thereof, and the like. In a further embodiment, active measurements may be performed when an estimated distance for a moving object (e.g., based on a boundary speed and a direction of the object) does not meet a safe distance threshold. An action may include, for example, controlling a hands free or autonomous vehicle.

In an embodiment, the processing system 210 is configured to estimate the distance of the processing system 210 from non-stationary and stationary objects using passive measurements. Specifically, the distance may be estimated based on the object's approximate size and the amount of pixels the object occupies in an image acquired by the passive sensor 230. Such an estimation may further include determining if the object is in close-proximity to the vehicle or not. For some objects that are not in close-proximity, no active measurement by the active sensor 220 is required. The close-proximity can be set based on a predefined threshold (e.g., a distance of under 100 meters may be determined to be in close-proximity).

Figure 3A:
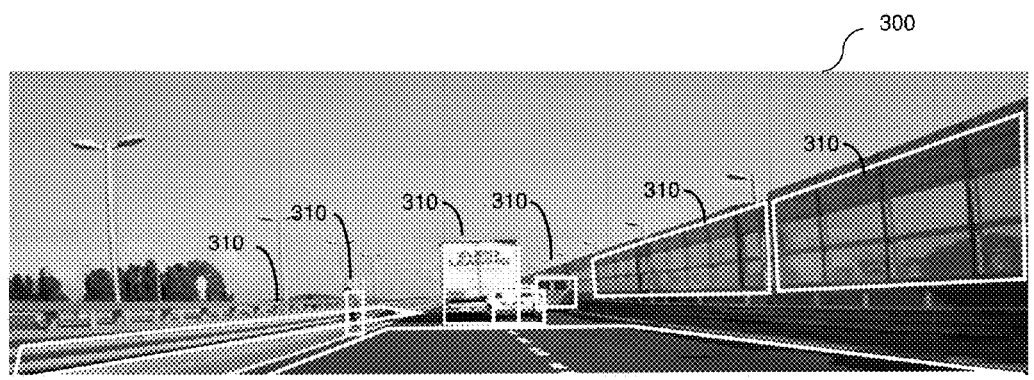
FIGS. 3A and 3B show identification of objects in an image according to an embodiment.
Figure 3B:
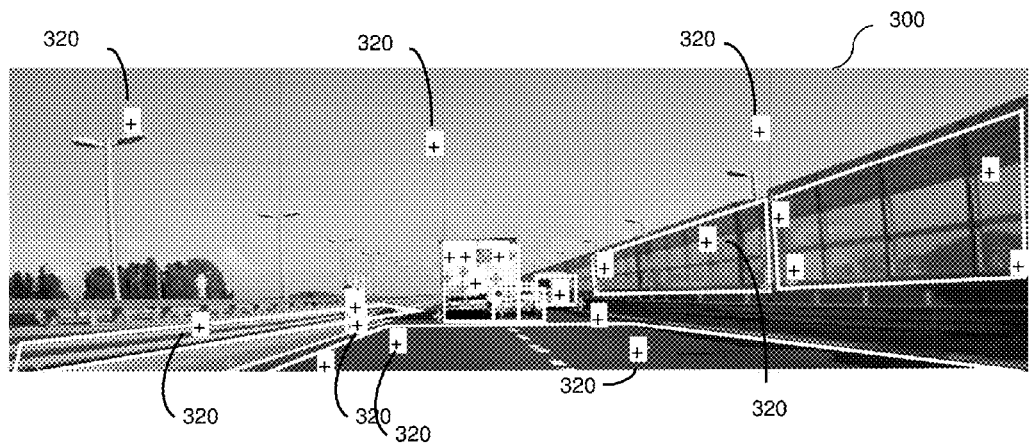

Consideration of certain (e.g., suspicious) objects allows reducing the number of active measurements by the active sensor 220. This is further demonstrated in reference to FIGS. 3A and 3B showing an example image of a scene for which a 3D-map is generated according to the disclosed embodiment. First, an image 300 of the environment is acquired by the passive sensor 230. The image 300 is segmented to identify objects 310. The segmentation and identification of objects can be performed using conventional image processing techniques. For example, the road, pedestrian, car, van, truck, crash barrier, and noise barrier are identified as objects 310. Then, object classification and passive measurements are performed. Based on the object classification, it is determined which active measurements should be made, that is, where to direct the laser beams emitted by the active sensor 220. The classification of objects may determine which objects are stationary, non-stationary, and suspicious. For example, the pedestrian, the car, the van, and the truck are classified as non-stationary and suspicious objects and, as such, active measurements in many different directions are triggered at locations 320 based, in part, on the object classification. The road, crash barrier, sky, road and sound barrier wall are classified as stationary and non-suspicious objects and, accordingly, fewer active measurements are performed.

As demonstrated by FIG. 3B, only a portion of the scene acquired in the image 300 is scanned with the active sensor 220. The locations that are actively measured are labeled as 320. Performing a greater number of active measurements on a limited number of objects allows for providing a higher resolution with respect to these objects. This further enables providing higher resolution in certain areas where detail recognition is required.

It should be noted that FIGS. 3A and 3B are merely examples and do not limit the various disclosed embodiments. In particular, more, fewer, or different objects 310 and/or 320 may be identified for images without departing from the scope of the disclosure.

Once all measurements are completed, a 3D-map of the scene may be generated. Specifically, the 3D-map is generated by computing the distance of the apparatus from any pixel in the acquired image. That is, each pixel should be associated with a distance value in order to generate the 3D-map. The distance values may be derived from the passive measurements and active measurements. In an embodiment, only a set of distance measurements are performed (e.g., fewer measurements than the number of pixels). The distance values can be computed or extrapolated using a plane equation or other equivalent techniques.

Returning to FIG. 2, the processing system 210 may comprise or be a component of a processor (not shown) or an array of processors coupled to the memory 215. The memory 215 contains instructions that can be executed by the processing system 210. The instructions, when executed by the processing system 210, cause the processing system 215 to perform the various functions described herein. The one or more processors may be implemented with any combination of general-purpose microprocessors, multi-core processors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system 210 may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The storage 240 may be magnetic storage, optical storage, and the like, and may be realized, for example, as flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information.

In one configuration, computer readable instructions for implementing any of the embodiments disclosed herein may be stored in the storage 240. The storage 240 may also store other computer readable instructions to implement an operating system, an application program, and the like. Computer readable instructions may be loaded in the memory 215 for execution by the processing system 210. The storage 240 may also be configured to store, for example, images, generated 3D-maps, 3D or 2D maps provided by mapping services (e.g., street-level maps), and the like.

The network interface 260 may allow the apparatus 200 to communicate with other apparatuses such as, but not limited to, a controller of the vehicle (not shown), a central controller (not shown), and a cloud storage device (not shown). For example, the network interface 260 may be configured to allow the apparatus 200 to communicate with the controller of the vehicle to provide operating instructions (e.g., stop, turn right, etc.) over a network (not shown). In an embodiment, the network interface 340 allows remote access to the apparatus 200 for the purpose of, for example, configuration, loading of new maps, and so on. The network interface 260 may include a wired connection or a wireless connection. The network interface 260 may transmit and/or receive communication media. For example, the network interface 260 may include a modem, a network interface card (NIC), an integrated network interface, a radio frequency transmitter/receiver, an infrared port, a USB connection, and the like.

Figure 4:
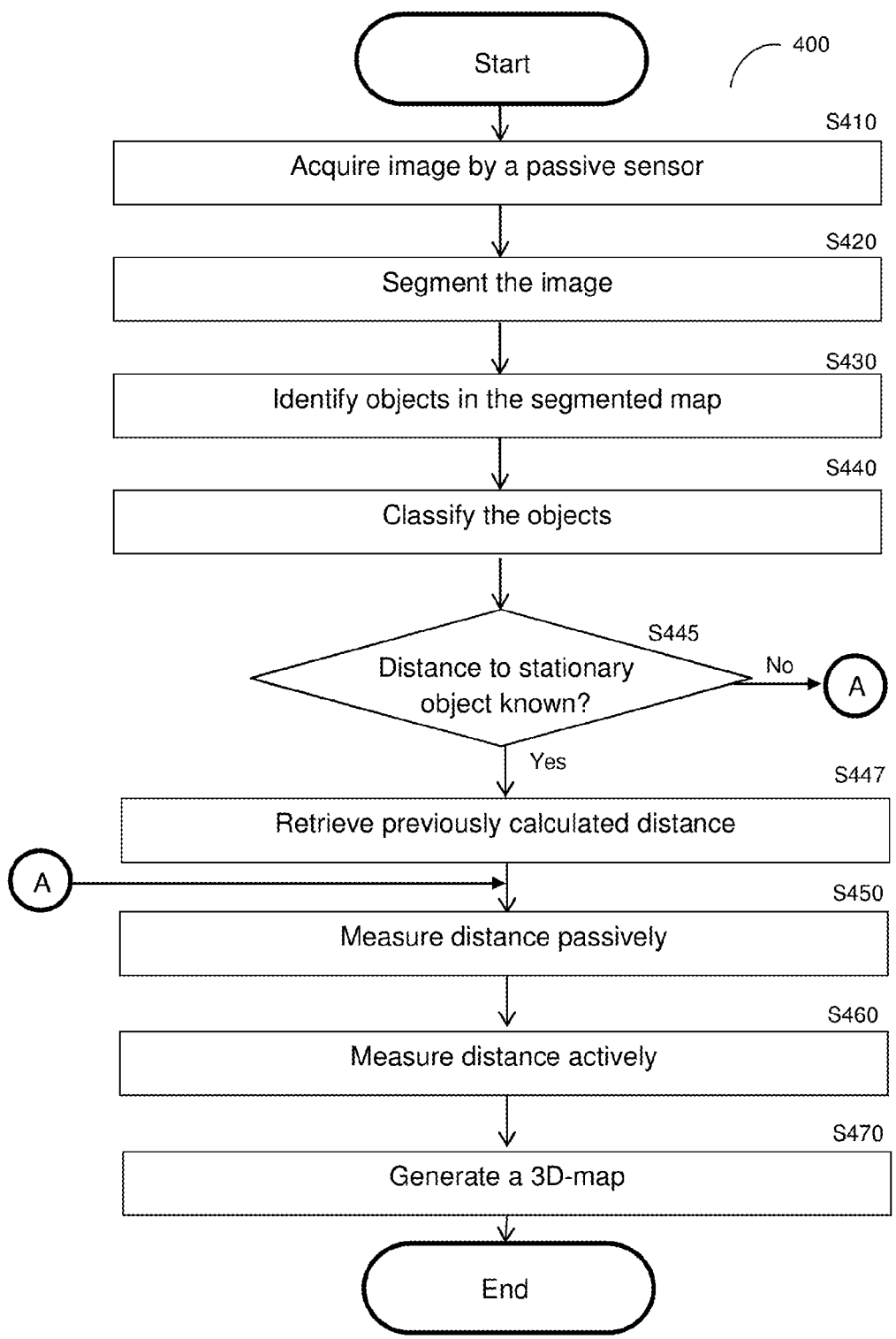
FIG. 4 is a flowchart illustrating a method for generating a 3D-map of a scene according to an embodiment.

FIG. 4 is an example flowchart 400 illustrating a method for generating 3D-maps of a scene according to an embodiment. In an embodiment, the method may be performed by an apparatus (e.g., the apparatus 200) operable in, e.g., a vehicle and the generated 3D-map is of the scene as would have been seen by an operator of the vehicle. The 3D-map may be generated based on fusion of passive and active measurements.

At S410, one or more images is acquired by a passive sensor. In an embodiment, the acquired images are saved in a memory according to their acquisition order. In another embodiment, the acquired images may include frames from a video being continually recorded.

At optional S420, the image may be segmented to generate a segmentation map. The segmentation map includes a plurality of segments, each of which features homogeneous pixels having the same color or substantially similar colors.

At optional S430, objects in the image or in the segmentation map are identified. In one embodiment, the objects may be identified based on, e.g., image recognition. It should be noted that an object can include multiple segments. For example, a truck colored with two different colors can be segmented as two segments, but identified as one object.

At optional S440, the identified objects are classified. In an embodiment, the objects may be classified into one or more of the following categories: non-stationary (i.e. moving or likely to move), stationary (i e, immobile), non-suspicious, or non-suspicious. In an embodiment, whether an object is non-stationary or stationary may be determined by identifying the object (e.g., using image recognition) and based on its type. For example, an object showing a building may be classified as non-stationary. In another embodiment, the non-stationary or stationary category of an object is determined by comparing two consecutive images taken during a predefined time interval to determine if the location of an object has changed. If the location of the object remains the same, the object is classified as stationary; otherwise, the object may be classified as non-stationary. In another embodiment, the object classification for some of the identified objects may be based on the size of the identified object. As a non-limiting example, an object having a size above a predefined threshold (e.g., an object large enough that a vehicle would need to navigate around the object) may be classified as suspicious, but an object having a size below the predefined threshold (e.g., an object small enough that the vehicle can ride over the object safely) may be classified as non-suspicious.

In yet another embodiment, the object classification for any of the identified objects may be based on the presence or absence of edges and/or patterns. Accordingly, objects having clear edges or patterns (e.g., objects having edges or patterns shown in images with clarity above a predefined threshold) may be classified as such. In an embodiment, the distances to objects having clear edges or patterns may be determined via passive measurements, while objects not having clear edges or patterns may be determined via active measurements.

In an embodiment, the classification based on the image comparisons may be further based on movement (or lack thereof) and/or positioning of the passive sensor. Specifically, when the passive sensor is not in motion (e.g., the vehicle stops at a traffic light) and the two consecutive images are taken from the same angle, the comparisons may indicate changes in the location of a moving object relative to other objects. When the passive sensor itself is in motion, the two consecutive images are taken from different angles. To allow accurate comparison, in an embodiment, a second image (e.g., the subsequently taken image) may be transformed to match an angle of a first image (e.g., a previously taken image), thereby placing the two images at the same angle. The image transformation can be performed using a virtual camera technique. It should be noted that, in one scene, an object can be classified as stationary, while in the next scene the object may be classified as non-stationary (e.g., a parked car). In an embodiment, the classification of stationary objects can be performed based in part on geographic maps such as 3D, 2D, street-view, and/or satellite maps provided mapping services. This allows identification of buildings and the like based on their known locations.

In an embodiment, the classification of suspicious objects is based on a predetermined list of suspicious objects. For example, objects predetermined to be suspicious may be, but are not limited to, other vehicles on the road, pedestrians, animals, debris on the road, and so on. The list can be dynamically updated Typically, objects that are in close-proximity to the vehicle and may pose danger or hazard are classified as suspicious. It should be noted that an object can be classified as "suspicious and stationary" or "suspicious and non-stationary". The various embodiments for object classifications are discussed in detail above.

At S445, it is checked, for each object classified as stationary, if the distance to the object classified as stationary is known. If so, execution continues with S447; otherwise, execution continues with S450. At S447, the distance to the stationary object is retrieved from previous calculations. This distance information can be derived from previously generated 3D maps. A stationary object may be determined to be stationary relative to the previously generated 3D map. As an example, if a passive sensor is not moving, an object is stationary, and a previously determined passive measurement and/or active measurement distance is available for the object from that passive sensor, then the current passive measurement for the object may be determined to be the previously determined distance.

At S450, passive measurements are performed based on the acquired image. The passive measurements include measuring at least a distance from at least one, some or all the classified objects. As noted above, such measurements are performed if the information cannot be derived from previously generated 3D maps. In an embodiment, the distance from each object classified as "stationary" or "non-suspicious and non-stationary" is determined via the passive measurements. As noted above, the distance is passively measured for stationary objects when the distances of the stationary objects are not available. In an embodiment, the passive measurement may include determining the distance to an object in the acquired image using a known size (e.g., number of pixels) of the object, a distance from a valid reference point, a vanishing point and vanishing line, a movement of an apparatus or vehicle, and so on. Various embodiments for performing passive measurements are discussed in more detail herein below with reference to FIGS. 5 and 6. The distance measurements may be saved in a memory (e.g., memory 215). It should be noted that the distance measurement may be for all or any of the pixels composing the object.

In another embodiment, the passive measurements may be performed based on movements of objects classified as non-stationary and non-suspicious. To this end, passively measuring the distance may include, but is not limited to, determining a boundary speed of the object and a direction of movement of the object. The boundary speed is a speed at which the boundary (i.e., outer surface) of the object is traveling. Based on the determined boundary speed and direction, a distance to the object may be estimated. In an embodiment, the estimated distance may be further based on a previously known distance to the object and/or previously generated 3D-maps including the object.

At S460, active measurements are performed. In an embodiment, the active measurements may be performed by using an active sensor (e.g., the active sensor 220). Performing the active measurements may include measuring a distance from some or all of the classified objects. In an embodiment, the distance is actively measured from objects classified as "suspicious", "non-stationary", and/or "suspicious and non-stationary". In another embodiment, the distance is actively measured when a reliable passive measured cannot be achieved. Reliable passive measurements cannot be achieved include when, for example, one or more objects and/or details in the acquired image appear several times; the image contains plain areas with no definite texture (e.g., walls and sky); details (wheels in a car) in the image are hidden in another view; when only one image from a unique angle (e.g., when the passive sensor includes only one camera) is available for passive measurement; and when the image contains one or more noisy areas. By re-measuring such objects, the accuracy is increased and the number of false alarms is significantly decreased.

In an embodiment, S460 includes emitting a laser beam (or a light pulse) using a laser diode. The laser hits a target and a portion of the laser's energy is reflected back toward the active sensor. The returning signal is detected and the time elapsed between emission of the light pulse from the laser and the detection of the returned signal is determined. A distance measurement of the distance to the object may be determined based on the determined elapsed time. It should be noted that the distance measurement may be for any or all of the pixels composing the images. In an embodiment, multiple active measurements may be performed per object, where at each such measurement, a laser pulse is directed to a different angle. A resolution of the measurement may be based on the number of measurements performed for each object.

In a further embodiment, S460 may further include determining an energy level for each emitted light pulse. The determined energy levels may be set based on parameters such as, but not limited to, pulse power and/or transmission characteristics (e.g., pulse length). Thus, an energy level is lower than another energy level if, for example, the pulse length, power, and/or height is lower. The energy levels may be determined based on, but not limited to, the passive energy measurements. In yet a further embodiment, the energy levels may be determined based on analysis of images acquired via a passive sensor. Lower energy levels may be utilized for, e.g., objects that are closer (i.e., objects requiring lower energy levels to successfully detect return signals), objects that are susceptible to harm from light pulses (e.g., eyes of a person or light sensors), and so on. Determining energy levels for active measurements is described further herein below with respect to FIG. 5.

The timing, direction, and energy level for each emitted laser beam may be controlled to achieve an accurate distance measurement. In an embodiment, at least the direction of the laser beam is adjusted based on the time and location difference between the time that an image was acquired by the passive sensor and when the active measurement has been triggered. This is performed in order to compensate for the movement of the active sensor and/or a target object during that time. The direction in which to point the active sensor can be estimated using accelerometer information by determining a current location of the active sensor relative to its location when the image was acquired.

It should be noted that the active measurements performed at S460 may be based on other active transmissions or emissions such as, but not limited to, radar, sound, laser triangulation, and the like. It should be noted that S450 and S460 can be performed in parallel. For example, active measurements on can be performed in parallel on objects classified non-stationary and/or objects that cannot be passively measured.

In certain embodiments, the energy level of the emitted laser is controlled based on the proximity of object to the vehicle (or the active sensor). The proximity can be determined using previous active and/or passive measurements in the area being scanned. By controlling the energy level, the energy consumption of the active sensor may be reduced as compared to always using laser beams having the highest possible amount of energy. Further, controlling the energy levels reduces the risk of hurting human eyes by the laser beams as objects that are in close proximity will be scanned with relatively low energy levels.

At S470, a 3D map is generated based on the passive and active measurements. In order to generate a 3D-map of the scene, a distance value for pixel in the acquired image should be available. In an embodiment, one or more distance values may be included in the 3D map for each segment in the segmentation map. Each distance value can be one of the passive or active measurements. In a preferred embodiment, at least 3 distance values for at least 3 pixels of each a segment should be included in the 3D map.

As noted above, a segment may be part of an object or may be the entire object. The distance values of all pixels in a segment can be computed or extrapolated based on the at least 3 distance measurements. To this end, in an embodiment, the plane equation is computed based on at least 3 distance measurements for at least 3 pixels in each segment. The computed plane equation may be utilized to determine all distance values of pixels in the same segment and/or on the same surface. It should be noted that other geometric techniques can be utilized the compute the distance values of all pixels in a segment without departing from the scope of the disclosure. It should be further noted that for some segments, distance values for all the pixels will be available through the active or passive measurements and, therefore, there is no need to solve the plane equation for such segments.

In another embodiment, if distance values of all pixels cannot be estimated based on the plane equation, then more active measurements will be triggered. In a further embodiment, the additional active measurements may be set with higher energy levels than previous active measurements.

In yet another embodiment if all distance values of all pixels are available from previous frames, then a limited number of active measurements may be utilized (e.g., 3 measurements) and the rest of the distance values are adjusted from measurement previously performed.

The rendering of the 3D-surface of each segment causes rendering of 3D representations of the identified objects, thereby resulting in a 3D-map of the scene. The resulting 3D-map can be later utilized to, e.g., provide driving directions to a controller controlling the operation of the vehicle.

Figure 5:
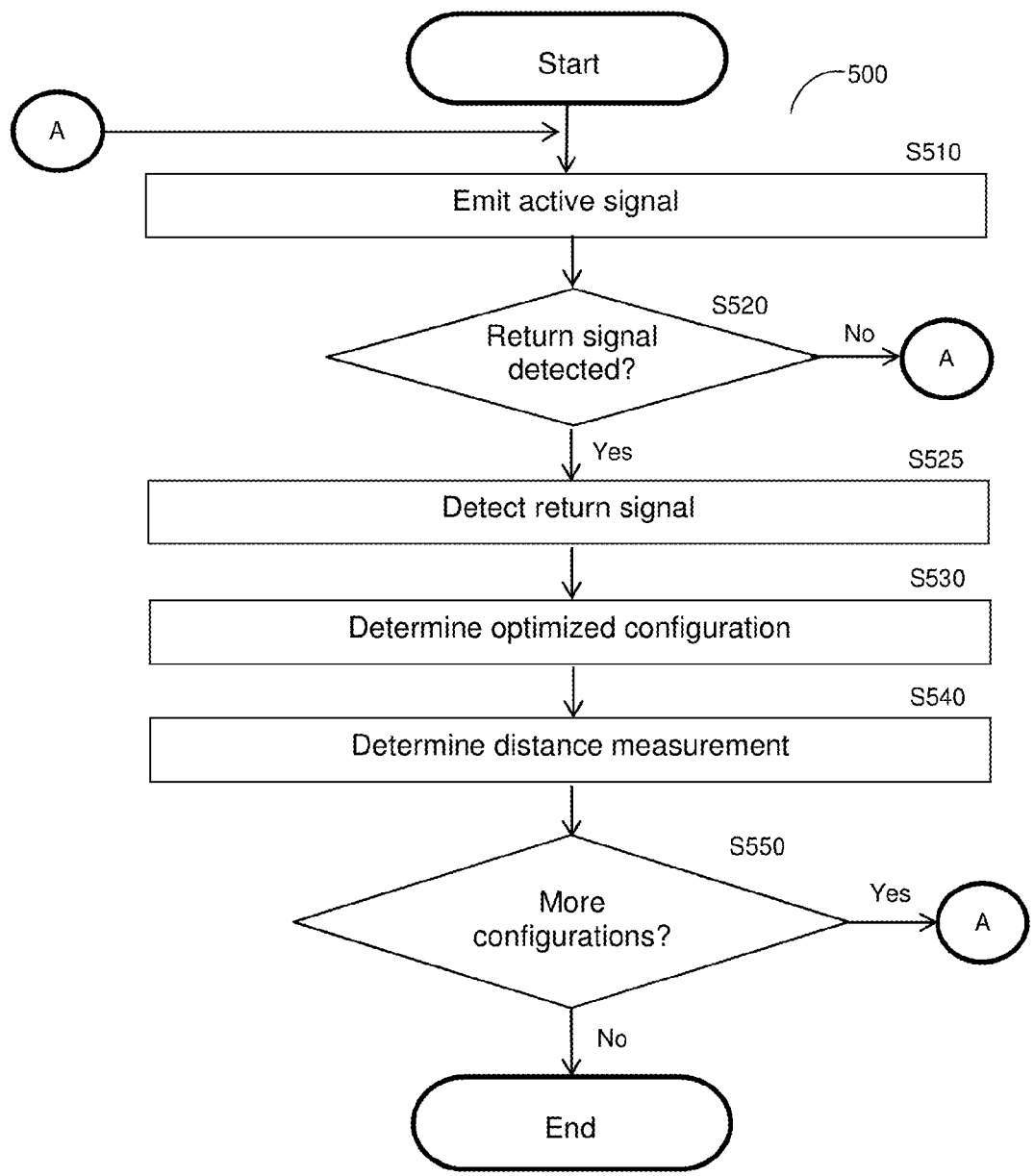
FIG. 5 is a flowchart illustrating a method for optimizing active measurements according to an embodiment.

FIG. 5 is an example flowchart 500 illustrating a method for optimizing active measurements for 3D-map generation according to an embodiment. The optimization aims to minimize energy consumption while maximizing accuracy of active measurements. In an embodiment, the optimized active measurements may include determining an optimized energy level for each direction in which lasers are emitted. In another embodiment, other active measurements may be optimized such as, e.g., radar, sound, laser triangulation, and the like.

At lower energy levels, return signals (e.g., reflections of the emitted lasers) may be undetectable. Further, even when the energy level is at a minimum required energy level for detection, misdetection of the return signals may occur due to noise. At higher energy levels, the emitted lasers waste energy and/or can cause harm to humans and/or sensors. Thus, the optimization aims to minimize energy levels of emitted lasers while maintaining accurate detections of return signals. The optimized energy levels may be set based on, but not limited to, pulse power and/or transmission characteristics (e.g., pulse length). Thus, an energy level is lower than another energy level if, for example, the pulse length, power, and/or height is lower.

At S510, a laser is emitted in a particular direction. In an embodiment, an energy level of the currently emitted laser may be based on an energy level of a laser previously emitted in that direction. In a further embodiment, the current energy level may be further based on a strength of a return signal detected for the previously emitted laser. If no return signal was detected for the previously emitted laser in that direction, the current energy level may be higher than the previously emitted energy level.

In another embodiment, if no laser was previously emitted in that direction, a default energy level may be utilized. The default energy level may be a predetermined level such as, for example, the highest possible energy level or the highest permitted energy level given regulatory constraints. Alternatively, the default energy level may be set equal to an optimized energy level determined for lasers emitted in another direction. In a further embodiment, the default energy level may be further based on an estimated distance of an object in the current direction of emission. For example, a default energy level utilized for an object that is estimated to be 5 meters away from a source of emission may be lower than a default energy level utilized for an object that is estimated to be 20 meters away. Determining energy levels for active measurements based on estimated distances is described further herein below with respect to FIG. 6.

In yet another embodiment, a default energy level may be utilized based on a predetermined model of a scene in which the active measurements will be performed. The default energy level utilized may be an upper bound energy level for an active sensor at the scene emitting a laser in the current direction of emission. The upper bound energy level may be based on, a maximum range of the beam within the scene. For example, the maximum range of the beam may be a distance from the active sensor to a wall of a room in a particular direction. Utilization of default energy levels based on the highest required energy level for a given scene rather than simply the highest possible or permitted energy level allows for use of reduced energy levels even at the beginning of determining optimized energy levels for active measurement.

In another embodiment, the direction of emission may be determined so as to emit the laser toward a particular pixel in a passively acquired image. Thus, in an embodiment, the optimization may be per pixel in the image such that an optimal energy level may be determined for each pixel in the image. In a further embodiment, the default energy level utilized for any such pixel may further be based on an optimized energy level determined for an adjacent pixel. In another embodiment, the default energy level may be based on an estimated distance determined via passive measurement.

At S520, it is determined whether a return signal was detected for the currently emitted laser and, if so, execution continues with S525; otherwise, execution continues with S510. If a return signal was not detected, at S510, the next laser emitted may be in the same direction as the currently emitted laser but using a higher energy level. In an embodiment, the energy level may be increased by a predetermined increment. At S525, a return signal is detected for the currently emitted signal. The return signal may be, e.g., a reflected laser.

At S530, an optimized configuration for active measurement emissions is determined based on the detected return signal. In an embodiment, the optimized configuration may be further determined based on a strength of the detected return signal. In a further embodiment, the strength of the detected return signal may be compared to a predetermined return signal strength or a predetermined range of return signal strengths. The optimized configuration may be determined based on the comparison.

The optimized configuration may include, but is not limited to, an optimized energy level, a selection of one or more active sensors to perform the active measurement, an optimized path for active measurements, and so on.

The optimized energy level may be determined so as to cause an optimized return signal. The optimized return signal may include, for example, any return signal within a predetermined range of return signals. In an embodiment, the optimized energy level may be determined based on a difference between the optimized return signal and a return signal for a previously emitted laser. In a further embodiment, the optimized return signal may be further based on a type of object for which an active measurement is performed. The type of object may be determined based on, e.g., analysis of passive sensor information (e.g., image recognition of a passively acquired image). For example, an optimized return signal may be lower for lasers emitted at humans or light sensors in a scene than for other objects.

In a further embodiment, the optimized energy level may be further based on changes in passive sensor information. For example, if a previously emitted laser was reflected off of an object and the object has since moved as demonstrated by consecutive images, the current energy level may be determined based on the optimized energy level for the previously emitted laser and a change in distance determined based on passive measurements.

The optimized configuration may include a selection of which active sensors to perform active measurements on an object when multiple active sensors are available. For example, if multiple active sensors are utilized in a room or if multiple active sensors are attached to a vehicle. The active sensor(s) to perform active measurements may be determined such that the lowest energy level may be required. To this end, the selected active sensor(s) may be the active sensor(s) that is/are closest to the object. Alternatively or collectively, the active sensor(s) to be utilized may be selected based on an angle of the object relative to the available active sensors.

In another embodiment, the optimized configuration may include an optimal path between locations in the scene for which a plurality of active measurements will be taken. The optimal path may be utilized to reduce time and energy utilized to change direction of the active emissions when performing multiple active measurements. The plurality of active measurements may be performed by, e.g., utilizing one or more mirrors or MEMS mirrors to capture return signals based on active emissions and moving the mirrors or MEMS mirrors based on the directions of the active emissions.

The optimal path may be determined based on, but not limited to, a time for changing the direction of the active emission from a first direction to a second direction, movements (direction, speed, acceleration, etc.) of the apparatus 200 and/or of mirrors or MEMS mirrors, a minimum time needed between measurements (e.g., 2 microseconds), and the like. The minimum time needed between active measurements may be further based on, e.g., a maximum range for objects in the scene. The optimal path may be determined such that the time between active measurements is minimized.

At S540, a distance measurement may be determined based on the return signal. The distance measurement may be based on, but not limited to, a time of flight of the laser. The distance measurement may be utilized for, e.g., determining optimized configurations for additional directions.

At S550, it is checked whether optimal configurations for additional directions are required and, if so, execution continues with S510, where the laser is emitted in a new direction. Otherwise, execution terminates.

Figure 6:
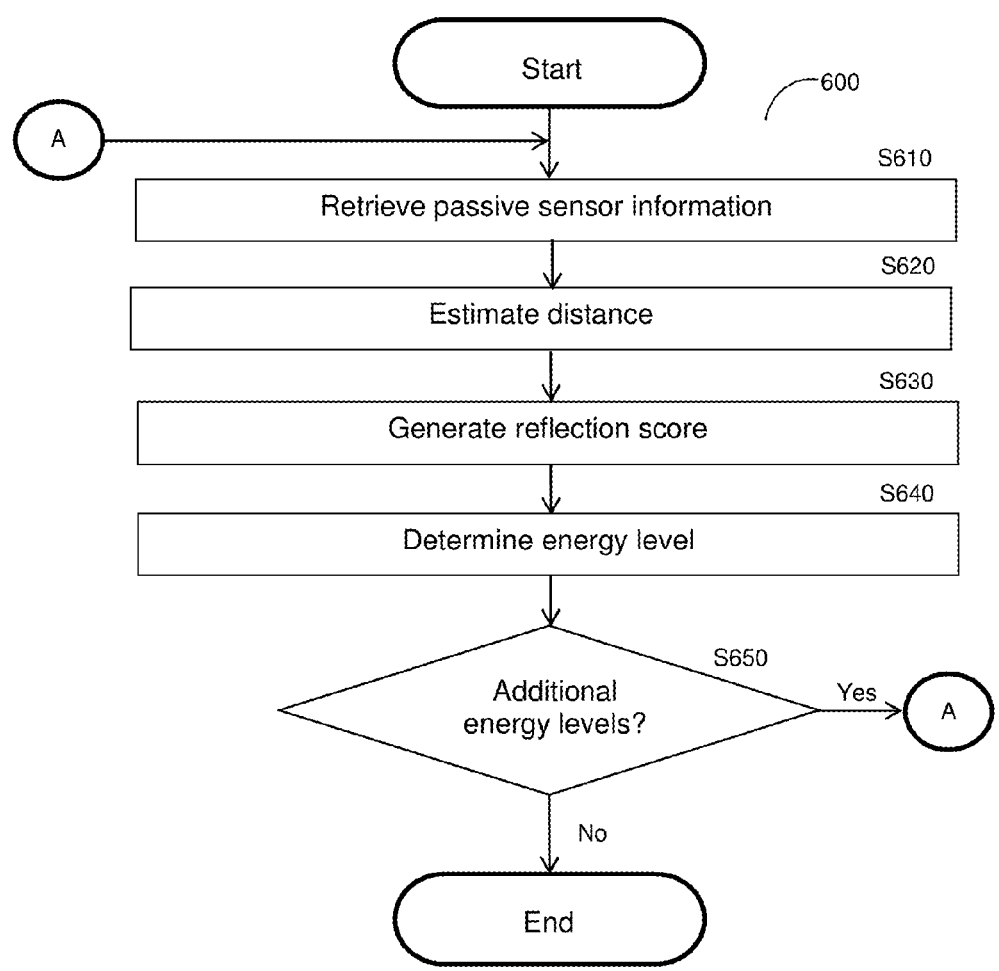
FIG. 6 is a flowchart illustrating a method for determining energy levels for active measurements based on estimated distances according to an embodiment.

FIG. 6 is an example flowchart 600 illustrating a method for determining energy levels for active measurements based on passive sensor information according to an embodiment. The determined energy level may be utilized, e.g., as a default energy level when determining an optimized configuration for active measurement, or may be utilized as an optimized energy level in an optimized configuration for active measurement.

At S610, information related to distance of objects is retrieved. In an embodiment, the information is retrieved from a passive sensor. The passive sensor information may include, but is not limited to, an image acquired by the passive sensor. In another embodiment, such information is based on previous active measurements.

At S620, a distance is estimated based on the retrieved information. The distance may be to an object or a portion thereof. In an embodiment, the estimated distance may be for a pixel in the image. The distance may be estimated based on, but not limited to, a previously determined distance, a previously determined location of the object, a speed and direction of a moving object, and the like. In an embodiment, if the distance is within a range, the estimated distance may determine to be, e.g., the maximum distance in the range, the average distance in the range, and the like. Estimating distances based on passive sensor information is described further herein above with respect to FIGS. 2 and 4.

At optional S630, a reflection score may be generated for the object. The reflection score represents a degree to which light is reflected off of the object and may be based on, but is not limited to, a color of the object, an orientation of the object, a surface roughness of the object, light, combinations thereof, and the like. To this end, S630 may further include determining a material of the object based on the passive sensor information. The material may be associated with, e.g., a predetermined known color or roughness. The material may be determined via, e.g., image recognition techniques.

At S640, an energy level for active measurement is determined based on the estimated distance and/or the reflection score. In an embodiment, determining the energy level may be further based on previous return signal strengths for particular distances and/or reflection scores. The previous return signal strengths may be based on, e.g., machine learning for previous measurements. The previous return signal strengths associated with particular distances and/or reflection scores may be stored in a translation table. If the determined energy level is subsequently utilized for an active measurement, the resulting return signal strength may be utilized to update the translation table.

At S650, it is determined whether additional energy levels are required and, if so, execution continues with S610; otherwise, execution terminates. In an embodiment, additional energy levels may be required if energy levels have not been determined for any pixels in an image and/or if a new image is acquired by a passive sensor.

It should be noted that the embodiments discussed herein above are described with respect to active measurements by lasers merely for simplicity purposes and without limitations on the disclosure. Other active measurements (such as, e.g., by radar, sound, laser triangulation, and the like) may be equally utilized without departing from the scope of the disclosed embodiments.

It should be noted that some disclosed embodiments are described with respect to optimizing active measurements for a vehicle merely for example purposes and without limitation on the disclosure. Any apparatus configured to collect active measurements such as a vehicle, a camera for capturing video for 3D movies, and the like, may be utilized without departing from the disclosed embodiments.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Figure 7:
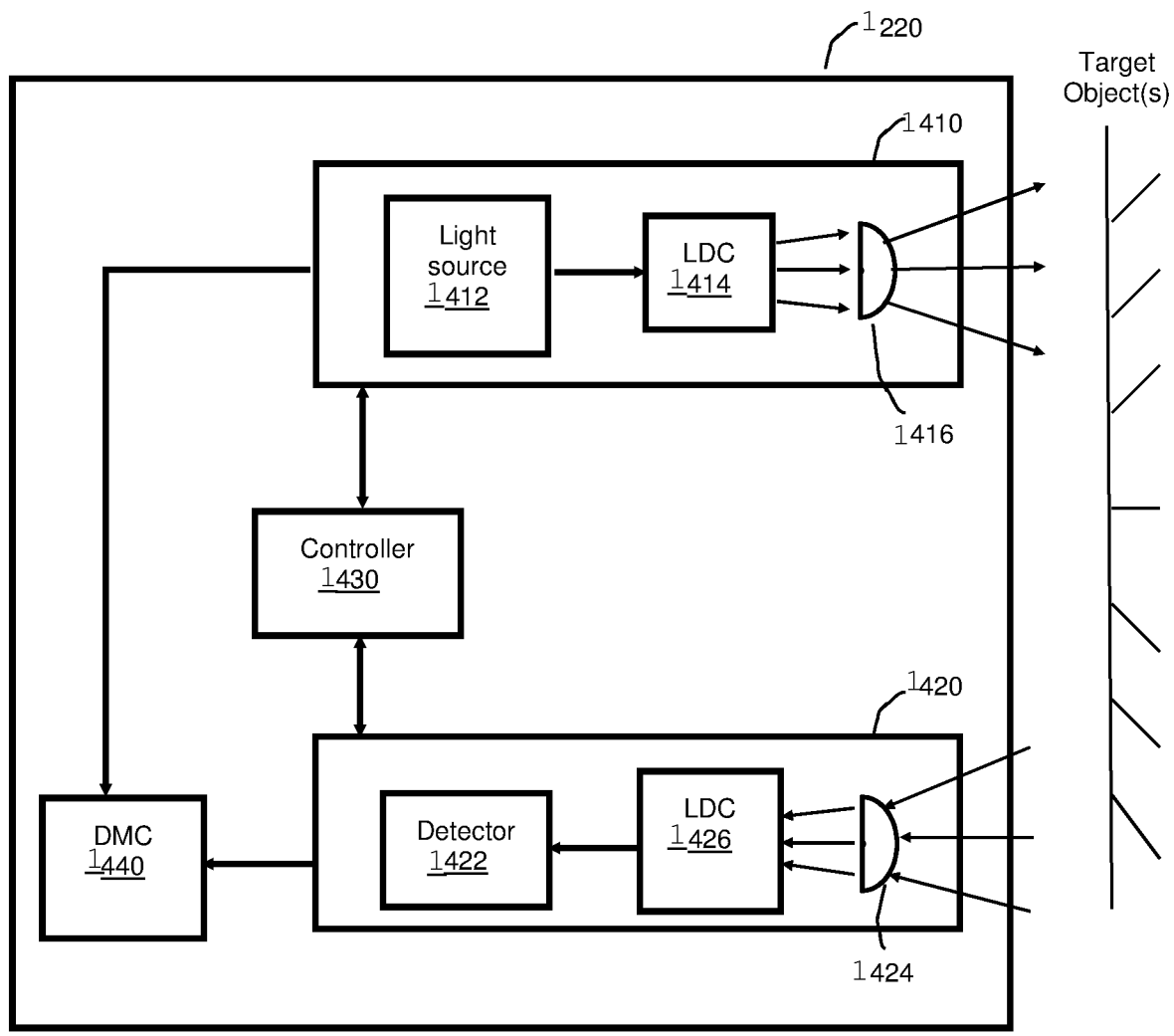
FIG. 7 is a block diagram of the active sensor arranged according to one embodiment.

FIG. 7 is an example block diagram of the active sensor 220 arranged according to one embodiment. The active sensor 220 includes a transmitter (TX) 1410 and a receiver

1420 connected to a controller 1430. In an optional configuration, the active sensor 220 also includes a distance measurement circuit (DMC) 1440. In one embodiment, the controller 1430 may be realized as the processing system 210. In another embodiment, the controller 1430 is a separate element from the processing system 210 and can be realized as, but not limited to, general-purpose microprocessors, multi-core processors, microcontrollers, DSPs, FPGAs, PLDs, controllers, state machines, gated logic, discrete hardware components, dedicated hardware finite state machines, or any other suitable entities that can perform calculations or other manipulations of information. It should be noted that, in certain configurations, the active sensor 220 may include a plurality of transmitters 1410 and/or a plurality of receivers 1420.

In an embodiment, the transmitter 1410 is configured to emit or transmit light pulses (e.g., laser beams) at varying energy levels and at different directions. The energy level, direction, and timing of each light pulse may be determined by the controller 1430. Multiple light pulses can be sent at different directions at roughly the same time. The energy levels of such light pulses may be the same or different.

As noted above, the active sensor 220 and/or a target object may be in motion when the active measurements are performed. A measurement to a specific point (a pixel in an identified object) is determined respective of the analysis of the image captured by the passive sensor. The location of such point is likely to be moved from when the image is captured and processed until the active measurement is triggered (i.e., a light pulse is emitted). To compensate for such a difference, the new location of the point is estimated. To this end, the timing, direction and/or energy level of the light pulse may be determined, with the estimated new location based on the determined timing, direction, and/or energy level.

The new location of the point to direct the active measurement to can be estimated based on the time elapsed since the image is captured until the measurement is triggered, information provided by one or more motion sensors (e.g., accelerometer, GPS, and/or gyroscope), previously captured images, and/or previously generated 3D maps. For example, gyroscope information can be used to determine an orientation of the sensor 220 at a new location respective of the old location (i.e., the location at which the image was captured).

In an embodiment, the transmitter 1410 includes a light source 1412, a static light directing circuit (LDC) 1414, and one or more transmit (TX) lenses 1416 utilized to focus the energy of the light pulses. The light source 1412 may include any device that radiates or emits electromagnetic radiation in multiple wavelengths or in a single wavelength. The light source 1412 may be realized as, but not limited to, a laser, a LED, an array of LEDs, and the like.

In an embodiment, the light source 1412 is configured to emit a light pulse at an energy level determined based on the maximum distance to an object that the pulse is directed to. The energy level may be controlled by the controller 1430.

The static LDC 1414 is configured to direct the light pulse emitted by the light source 1412 in a particular direction. The static LDC 1414 can be implemented without any moving parts. In one embodiment, the static LDC 1414 is realized using a microelectromechanical system (MEMS) mirror or an array of MEMS mirrors. When the static LDC 1414 is realized using a single MEMS mirror, the scanning may be performed along both the X and Y axes by the same mirror. Alternatively, the static LDC 1414 is realized using two MEMS mirrors, each MEMS mirror be can used to scan along a different axis. In another embodiment, the static LDC 1414 is realized using an acousto-optic modulator (AOM). In yet another embodiment, the static LDC 1414 is realized using an electro-optic modulator (EOM). Different realizations of the static LDC 1414 may require different configurations.

Figure 15:
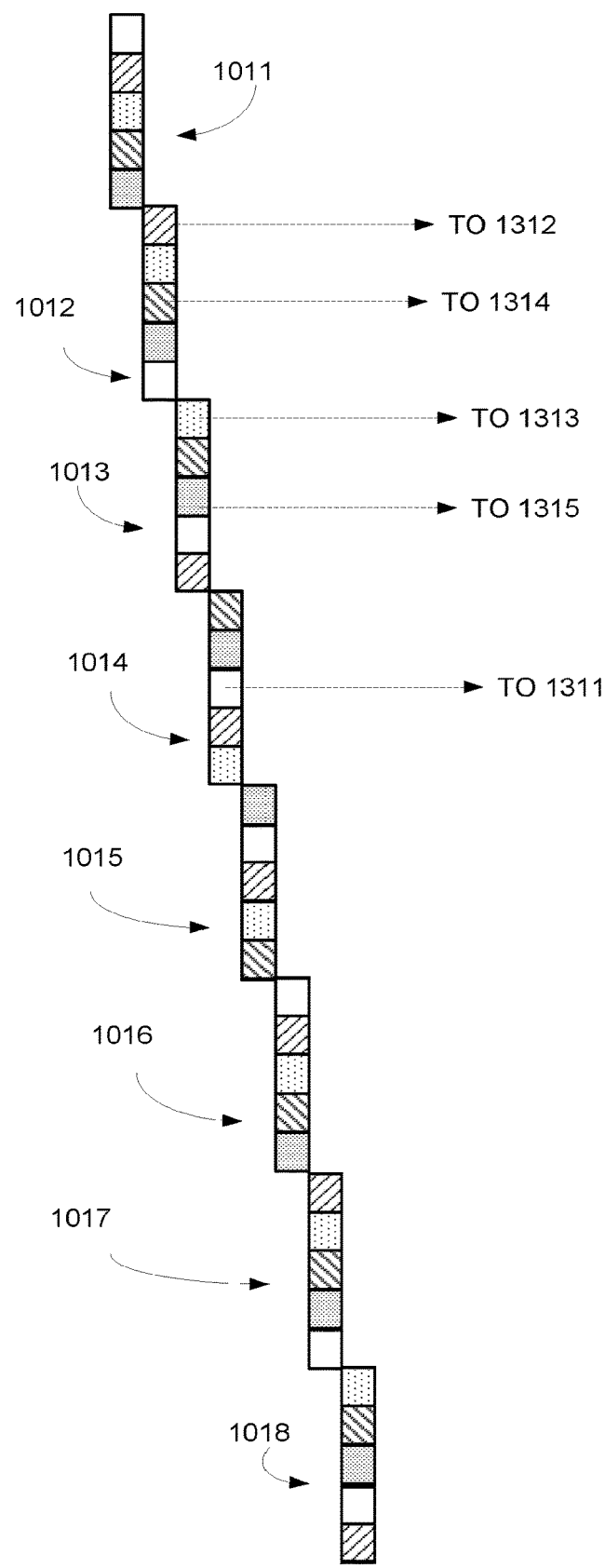
FIG. 15 illustrates an example of image plane sections associated with different transmitters, detectors and an optical multiplexer.

A MEMS mirror is an optical beam steering device. When using a MEMS mirror in the static LDC 1414, a light pulse (or beam) can be steered to a specific direction and/or split into different directions. In this configuration, the MEMS mirror is horizontally placed in the LDC 1414. This is further demonstrated in FIG. 15, showing the static LDC 1414 constructed using a MEMS mirror 1510.

Figure 8:
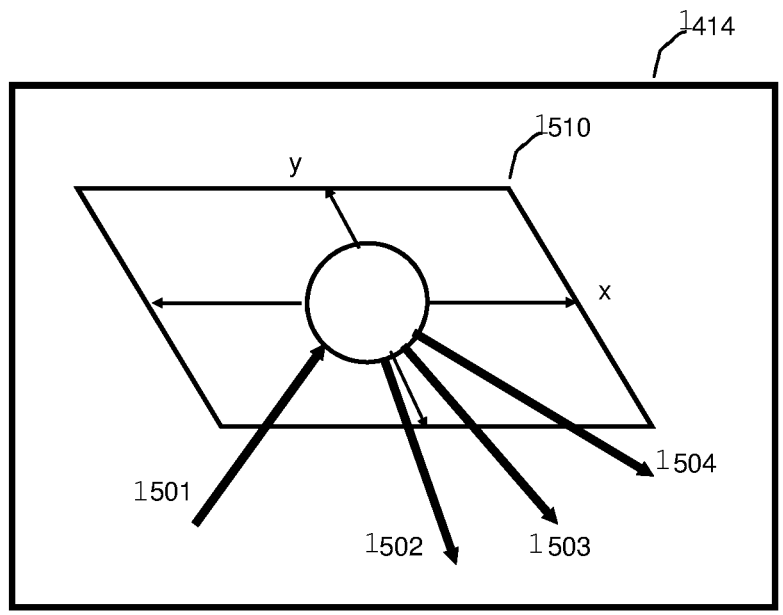
FIG. 8 is a schematic diagram of a static LDC constructed using a MEMS mirror according to an embodiment.

In this configuration, a light beam 1501 hits the MEMS mirror 1510 at one direction and is reflected at a different direction controlled by the controller 1430 (controller 1430 not shown in FIG. 8). Specifically, the MEMS mirror 1510 can be tilted along the X and Y axes, where the tilting may be caused by applying an electric signal (generated by, e.g., the controller 1430) along the X and Y axes. This signal causes changing of the tilt of the mirror 1510 at a predefined range of spatial angles. As shown in FIG. 8, one light beam 1501 can be reflected from the MEMS mirror 1510 in different directions (illustrated as in FIG. 15 as example reflected beams 1502, 1503, and 1504, respectively).

In another embodiment, a constant electric signal is applied, thereby causing the MEMS mirror 1510 to tilt at a predefined range of spatial angles. In this embodiment, the transmission of the light beam is timed according to the angle that the mirror is at. This allows for transmission of the beam at a direction without causing any sudden or rapid changes and/or waiting for the MEMS mirror 1510 to stabilize at the requested direction. In certain configurations, the MEMS mirror 1510 can be replaced with other types of scanning mirrors.

An EOM is an optical device in which a signal-controlled element exhibiting the electro-optic effect is used to modulate and steer a light beam. An AOM is an optical device in which the acousto-optic effect is utilized to modulate and steer a light beam. An electric signal drives the transducer to vibrate, which creates sound waves in the material, thereby causing modulation in the light beam.

Figure 9:
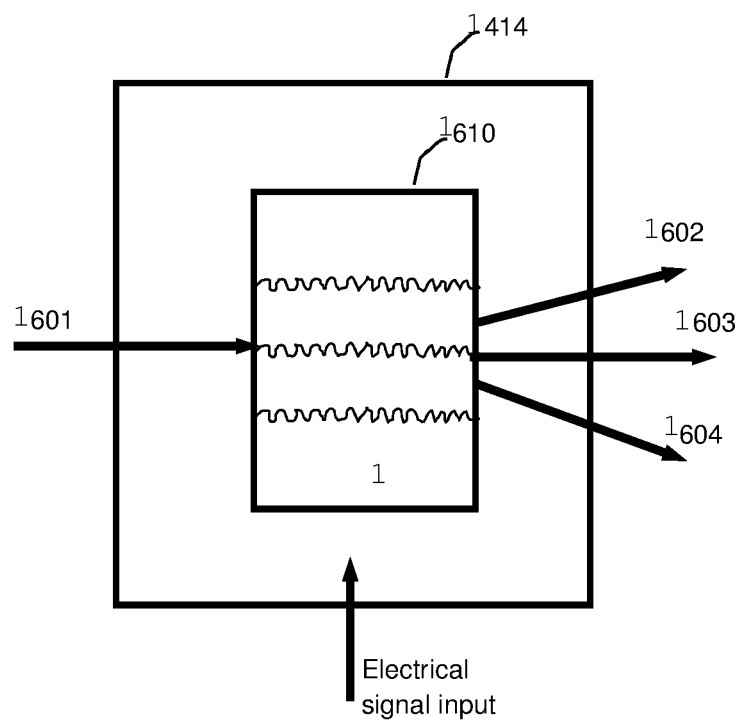
FIG. 9 is a schematic diagram of a static LDC constructed using an optical modulator according to an embodiment.
Figure 10:
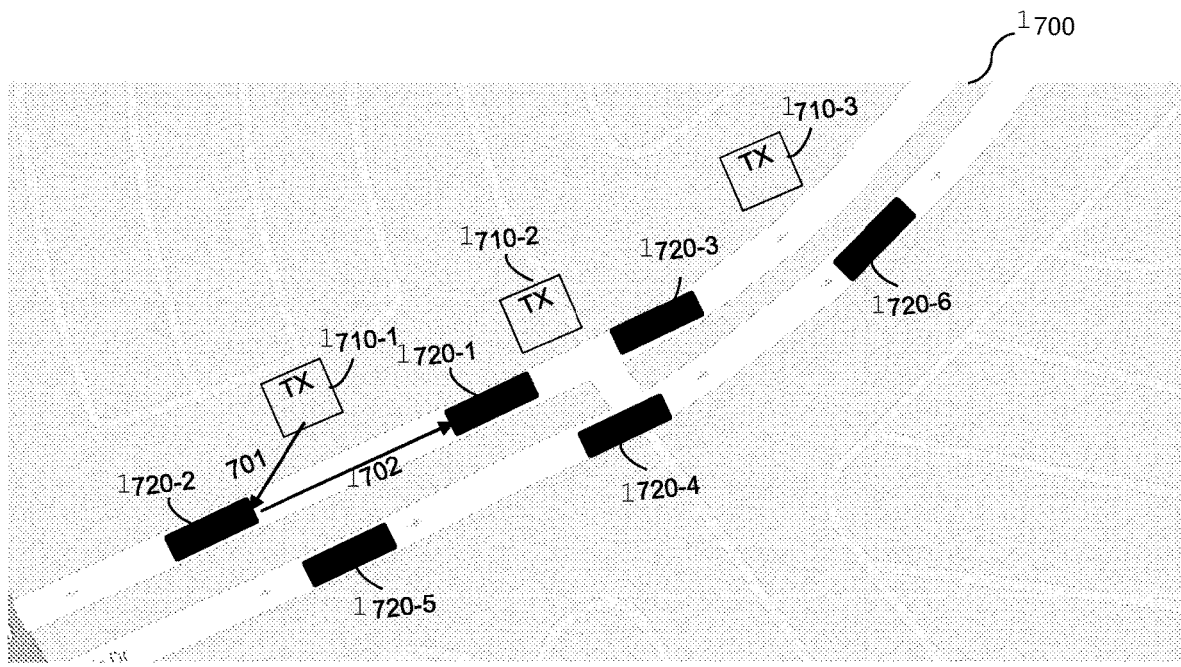
FIG. 10 illustrates the operation of a distributed optical sensor according to an embodiment.

When using an AOM or EOM in the static LDC 1414, a light beam (or pulse) can be steered to a specific direction and/or split into different directions. In this configuration, the AOM or EOM may be placed vertically in the LDC 1414. This is further demonstrated in FIG. 9 showing the static LDC 1414 constructed using an optical modulator 1610. The optical modulator 1610 may be an AOM or an EOM.

In this configuration, the light beam 1601 hits the mirror 1610 at one direction and is reflected in different directions as controlled by, e.g., the controller 1430 (controller 1430 not shown in FIG. 9). Specifically, the controller 1430 generates an electrical signal input to the optical modulator 1610, and such a signal causes the modulator 1610 to steer the beam 1601 in different directions. As shown in FIG. 9, one light beam 1601 can be reflected from the MEMS mirror 1610 in different directions (illustrated as example reflected beams 1602, 1603, and 1604, respectively).

Using the above-mentioned configuration, the static LDC 1414 can direct the light beams at multiple spatial angles. In an embodiment, the static LDC 1414 is synchronized with the light source 1412 so as to direct each emitted light at a different spatial angle. In another embodiment, the static LDC 1414 is controlled to rapidly change between angles to perform a large number of active measurements (using the active sensor) in each frame. For example, in each frame of 30 msec, about 30,000 active measurements may be performed. The angles or directions to direct the light beam may be preordered in a specific order to achieve maximum area scanning during a predefined time interval.

In an embodiment, the lenses 1416 are collimating lenses. For single and multi-mode lasers with cylindrical symmetry, the collimating lenses 1416 may magnify the beam waist of the laser and may transform the laser beam angular distribution into the far field. In another embodiment, the cylindrical lenses may equalize the spread angles in both directions.

In an embodiment, the receiver 1420 is configured to detect light signals reflected from a target object to allow active measurements of a distance to an object. In an embodiment, the transmitter 1410 transmits light pulses that hit a target and a portion of each pulse's energy is reflected back toward the receiver 1420. The reflected signals are detected and the time elapsed between emission of the respective light pulse and the detection of the returned signal is determined. In a further embodiment, the DMC 1440 measures the distance to the object based on the elapsed time.

In an optional embodiment, the DMC 1440 measures the distance based on the phase delay between the transmitted and reflected (received) light signals. In this embodiment, the transmitted light pulses are sinusoidally modulated at varying frequencies or at a single frequency.

In one embodiment, the receiver 1420 includes a detector 1422 and lenses 1424. Optionally, the receiver 1420 also includes a static LDC 1426. The detector 1422, in an embodiment, is realized as an array of photodiodes. In another configuration, the detector 1422 is realized as a charge coupled device (CCD) or as one or more complementary metal oxide semiconductor (CMOS) light sensors. The configuration of the receiver 1420 depends on the type of the light source.

In an embodiment, to expedite the acquisition of the active measurements, the transmitter 1410 is configured to transmit multiple light pulses at different directions simultaneously, thereby allowing for measurement of different distances based on the simultaneous light pulses. To this end, the receiver 1420 is configured to detect all reflected signals in parallel.

In another embodiment, the detector 1422 receives light signals reflected from specific directions after hitting the target object. This allows for reduction of the crosstalk and the optical noises by filtering out signals from other directions. To this end, the static LDC 1426 is controlled, by the controller 1430, to direct signals reflected from specified directions to the detector 1422. As noted above, a static LDC 1426 can be realized as a MEMS mirror, an array of MEMS mirrors, an AOM, an EOM, and the like.

The lenses 1424 may also be designed to reduce the crosstalk and to increase the signal to noise ratio (SNR). To this end, the lenses 1424 are typically either infrared filters or polarized lenses. If the lenses 1424 are polarized lenses, in an embodiment, the light source 1412 may send polarized light. Reducing the crosstalk is important when, for example, many vehicles equipped with scanning capabilities are driving on the same road and, in particular, when those vehicles are close to each other. Increasing the SNR allows transmission of low energy light pulses and efficient detection of reflections thereof.

In an embodiment, the lenses 1424 include a polarized lens which reduces optical noise and crosstalk. In a further embodiment, the lenses 1416 may also include a polarizer with the same angle as the lenses 1424. In an embodiment, the predefined angle is 145 degrees. In an embodiment, each active sensor 220 only detects light signals that were generated by its own transmitter 220, while signals generated by other apparatuses (installed on different vehicles) may be filtered. Therefore, the configuration of lenses 1424 and 1416 with polarized lenses would eliminate any light signals transmitted by other vehicles driving in, for example, the opposite direction.

The active sensor 220 discussed with reference to FIG. 14 can be implemented as a single component. The single component may be realized as a chipset, an ASIC, and the like. In another embodiment, the active sensor 220 may be implemented as a distributed component including one or more transmitters 1410 and receivers 1420, controlled by multiple controllers or a single centralized controller 1430. Further, in such an embodiment, the same optics can be shared between the transmitter and receiver. That is, the optical signal can be received and transmitted through the same optical path.

In one distributed configuration of the active sensor 220, the transmitter or transmitters are stationary (e.g., installed on poles on the side of a road) while the receiver or receivers are non-stationary (e.g., installed on the moving vehicles). This distributed configuration is further illustrated in FIG. 17, which shows an example bird's eye view map utilized to describe an embodiment.

The transmitters 1710-1 through 1710-3 (hereinafter referred to individually as a transmitter 1710 and collectively as transmitters 1710, merely for simplicity purposes) are placed along the road at locations covering one lane and do not interfere with signals transmitted at the opposite lane. To measure a distance, for example, between cars, the times at which the light pulse was transmitted and the times at which the light pulse was received, as well as the locations of the transmitters 1710 and one or more of the cars should be known. The receivers (not shown in FIG. 17) may be installed on any or all of the vehicles 1720-1 through 1720-6.

As an example, in order to measure the distance between the vehicles 1720-1 and 1720-2, the locations of the transmitter 1710-1 and the vehicle 1720-1, the time at which the light pulse 1701 was transmitted by the transmitter 1710-1, and the time at which the retuned signal 1702 was detected by the receiver (not shown) in the vehicle 1720-1 are determined. The location of the vehicle 1720-1 can be provided by a GPS in the vehicle 1720-1.

The light pulse 1701 travels from the transmitter 1710-1 to the vehicle 1720-2, and is returned as a signal 1702 from the vehicle 1720-2 to the vehicle 1720-1. Based on the location of the vehicle 1720-1 and the location of the transmitter 1710-1 as well as the time at which the light pulse 1701 was transmitted, the distance between the vehicle 1720-1 and the vehicle 1720-2 can be determined, for example, by the receiver in the vehicle 1720-1. The information related to time and locations can be shared using communication protocols.

In another distributed configuration of the active sensor 220, the transmitters and the receivers are non-stationary but are separated. Thus, the transmitters and receivers may be installed on, for example, different vehicles. Each transmitter is configured to cover a section of a scene (e.g., a road) and, therefore, each object in the covered section is illuminated only once by the transmitter at a point that is close to the object. Thus, the transmitted light pulses may be at a lower energy level. The measurement of the distances is performed as described further herein above with respect to the distributed configuration. The location of the transmitters, in this case, can be provided by a GPS.

There may be provided a system that is compact and cheap. There may be provided a method and a computer program product for storing instructions to execute the method.

Instead of illuminating the entire scene the system may illuminate only target pixels of target objects and receive reflected light pulses from the target pixels.

The overall number of distance measurement units may be set based on a number of concurrently illuminated target pixels.

Within an image each target object may "cover" one or more target pixels.

The distance measurement units may be fed by an electrical multiplexer that dynamically couples detectors to the distance measurement units.

The number of detectors may also be reduced—especially when using an optical multiplexer and illuminating the target objects so that reflected light pulses detected by a detector resulted from an illumination of one or more target objects by a single transmitter.

Figure 11:
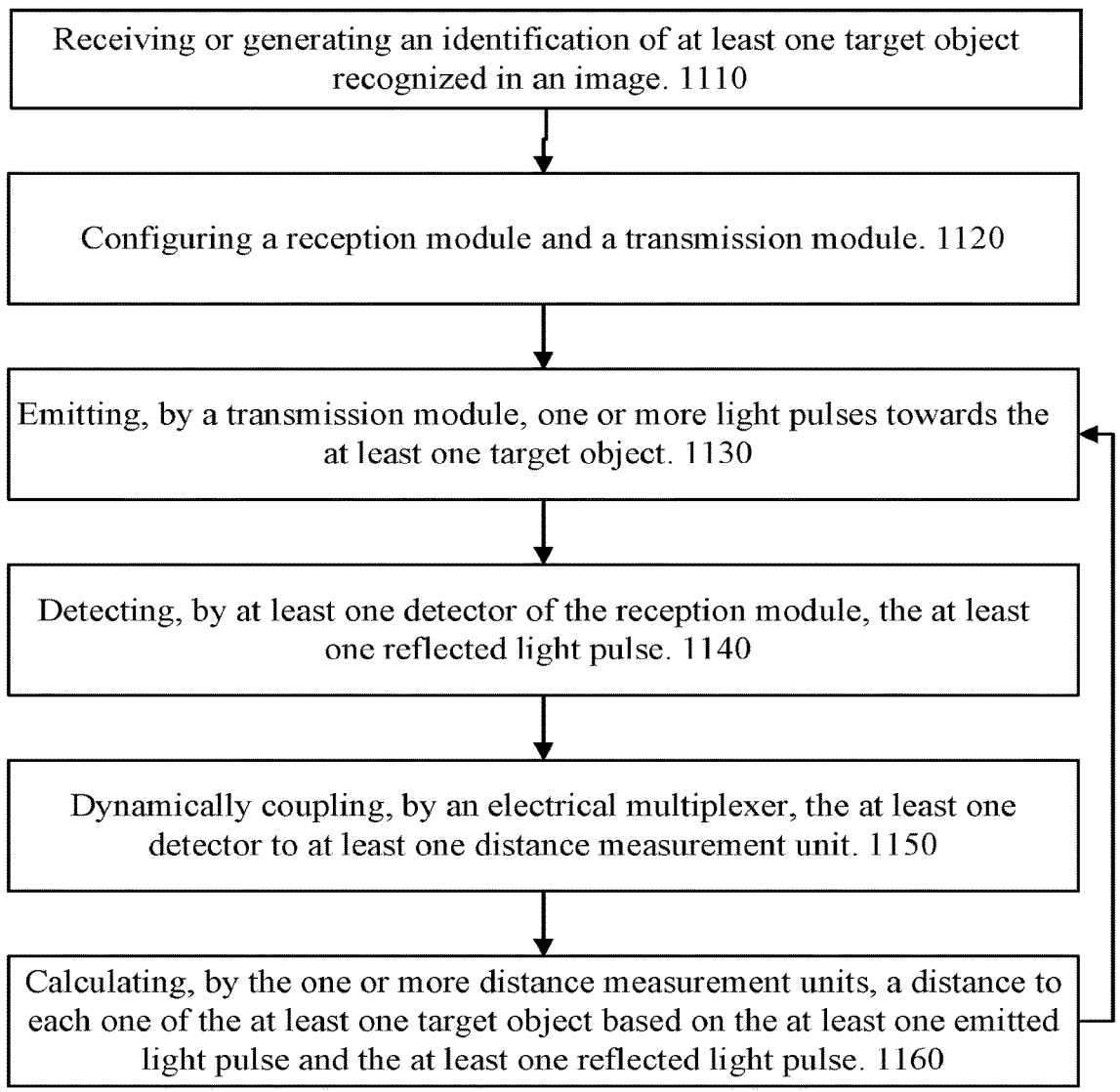
FIG. 11 illustrates an example of a method.

FIG. 11 illustrates method 1100 according to an embodiment of the invention.

Method 1100 may include at least some of the following steps:
1) Step 1110 (S1110) of receiving or generating an identification of at least one target object recognized in an image.
2) Step 1120 (S1120) of configuring a reception module and a transmission module.
3) Step (S1130) of emitting, by the transmission module, one or more light pulses towards the at least one target object.
4) Step (S1140) of directing, by an optical multiplexer of the reception module, towards at least one detector, at least one reflected light pulse. The at least one reflected light pulse was reflected from the at least one target object.
5) Step (S1150) of detecting, by at least one detector of the reception module, the at least one reflected light pulse.
6) Step (S1160) of dynamically coupling, by an electrical multiplexer, the at least one detector to at least one distance measurement unit.
7) Step (S1170) of calculating, by the one or more distance measurement units, a distance to each one of the at least one target object based on the at least one emitted light pulse and the at least one reflected light pulse.

The at least one detector may belong to multiple detectors of a reception module. The at least one distance measurement unit may belong to multiple distance measurement units of the reception module.

The number of detectors may exceed a number of distance measurement units. This may reduce the cost of the system as distance measurement units may be costly. The reduction of the number of distance measurement units reduces the overall cost of the system. The number of distance measurement units may be selected to equal (or to exceed) a maximal number of concurrently received reflected light pulses.

Step 1110 may include acquiring the image by a passive sensor, by an active sensor, or by any other manner.

Step 1120 may include setting, by a controller, the electrical multiplexer, the optical multiplexer, and multiple transmitters of the transmission module. The setting may be based on at least one location of the at least one target object.

A given light pulse may be directed towards a given location of a given target object. Step 1120 may include selecting a transmitter based on a first axis coordinate of the given location, and selecting a timing of transmission of the given light pulse based on a scanning pattern of a mechanical transmission scanner, and a second axis coordinate of the given location.

For example—assuming that the image is mechanically scanned along the X-axis and is electrically scanned along the Y-axis. The Y-axis coordinate of the given location is used to select a transmitter while the X-axis coordinate is used (in conjunction with the scanning pattern of transmission scanner) to determine when to transmit a light pulse from the selected transmitter.

Step 1130 may include at least one out of:
1) Mechanically scanning the image along a first direction, and electrically scanning the image along a second direction.
2) Deflecting, by a transmission scanner, the at least one or more light pulses towards the at least one target object. In the reception module there may be provided a reception scanner that may deflect reflected light pulses towards the optical multiplexer. The transmission scanner and the reception scanner may be synchronized.
3) Emitting a light pulse by a transmitter of the transmission module only when the light pulse is directed towards the at least one target object.
4) Moving a transmission scanner while maintaining multiple transmitters of the transmission module static.
5) Emitting the at least one light pulse without concurrent emissions from two or more transmitters of the multiple transmitters.
6) Independently controlling different transmitters of the multiple transmitters.
7) Emitting the light pulses from multiple transmitters that are positioned on opposite sides of the transmission scanner.

The multiple transmitters of the transmission module are associated with multiple temporary fields of view that differ from each other. The aggregate area of the multiple temporary detector fields of view may be a fraction of an area of the scene.

Step 1140 may include at least one out of:
1) Deflecting, by a reception scanner, the at least one or more reflected light pulses towards the optical multiplexer.
2) Directing, by the optical multiplexer and to the at least one detector, reflected light pulses associated with a segment of at least one transmitter field of view.
3) Directing different segments of a temporary field of view to different detectors.
4) Directing, by the optical multiplexer and to each detector of multiple detectors, reflected light pulses associated with a segment of each temporary transmitter field of view.
5) Directing, to a detector of the multiple detectors, segments of each temporary transmitter fields of view that are located at a same relative location within the temporary transmitter fields of view. See, for example, FIG. 14.
6) Directing, to a detector of the multiple detectors, segments of each temporary transmitter fields of view that are located at different relative locations within the temporary transmitter fields of view. See, for example, FIG. 15.

The multiple temporary fields of view may form a staggered array of temporary fields of view.

The multiple temporary fields of view of the multiple transmitters may be mapped to multiple image plane sections. Step 1140 may include optically coupling a single segment of each image plane section to a single detector.

Step 1150 may be executed by one or more detectors out of multiple detectors. The multiple receivers may be positioned on opposite sides of the reception scanner.

Step 1160 may include coupling, at any given point of time, up to a single detector to a single distance measurement unit.

Figure 12:
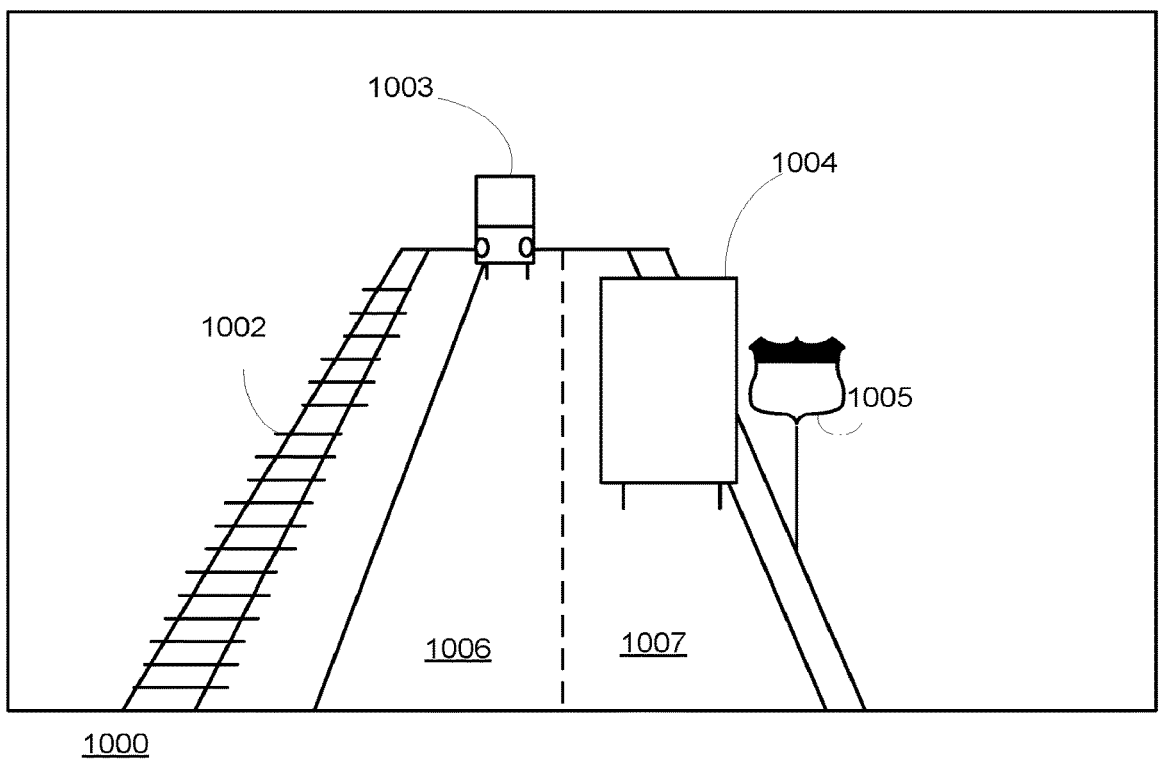
FIG. 12 illustrates an example of an image, target objects and target pixels.
Figure 12:
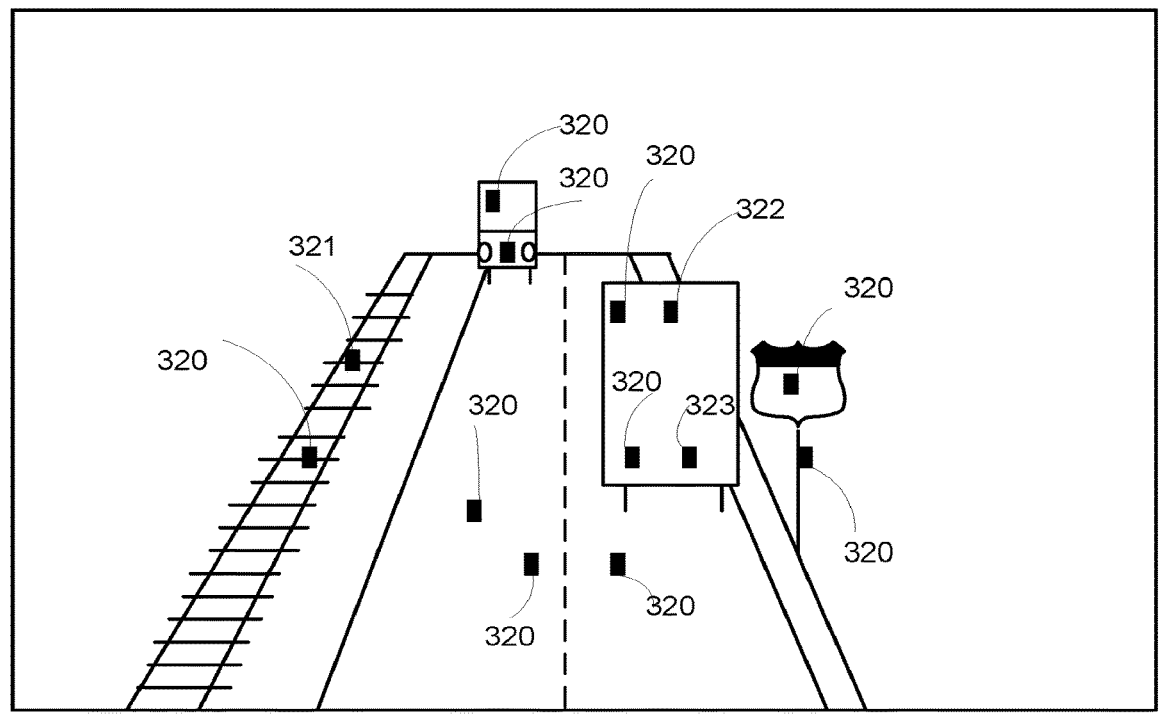

FIG. 12 illustrates an example of an image, target objects and target pixels.

The upper part of FIG. 12 shows an image 1000 that is acquired by a system. The image 1000 includes a first lane 1007, a second lane 1006, a railroad 1002, a road sign 1005, a first truck 1004 and a second truck 1003.

The image 1000 includes target objects such as first lane 1007, second lane 1006, railroad 1002, road sign 1005, first truck 1004 and second truck 1003.

Each target object may be illuminated in one or more locations. Each location may be associated with a target pixel. The lower part of FIG. 12 illustrates target pixels 320, 321, 322 and 323 that are included in the target objects mentioned above.

Figure 13:
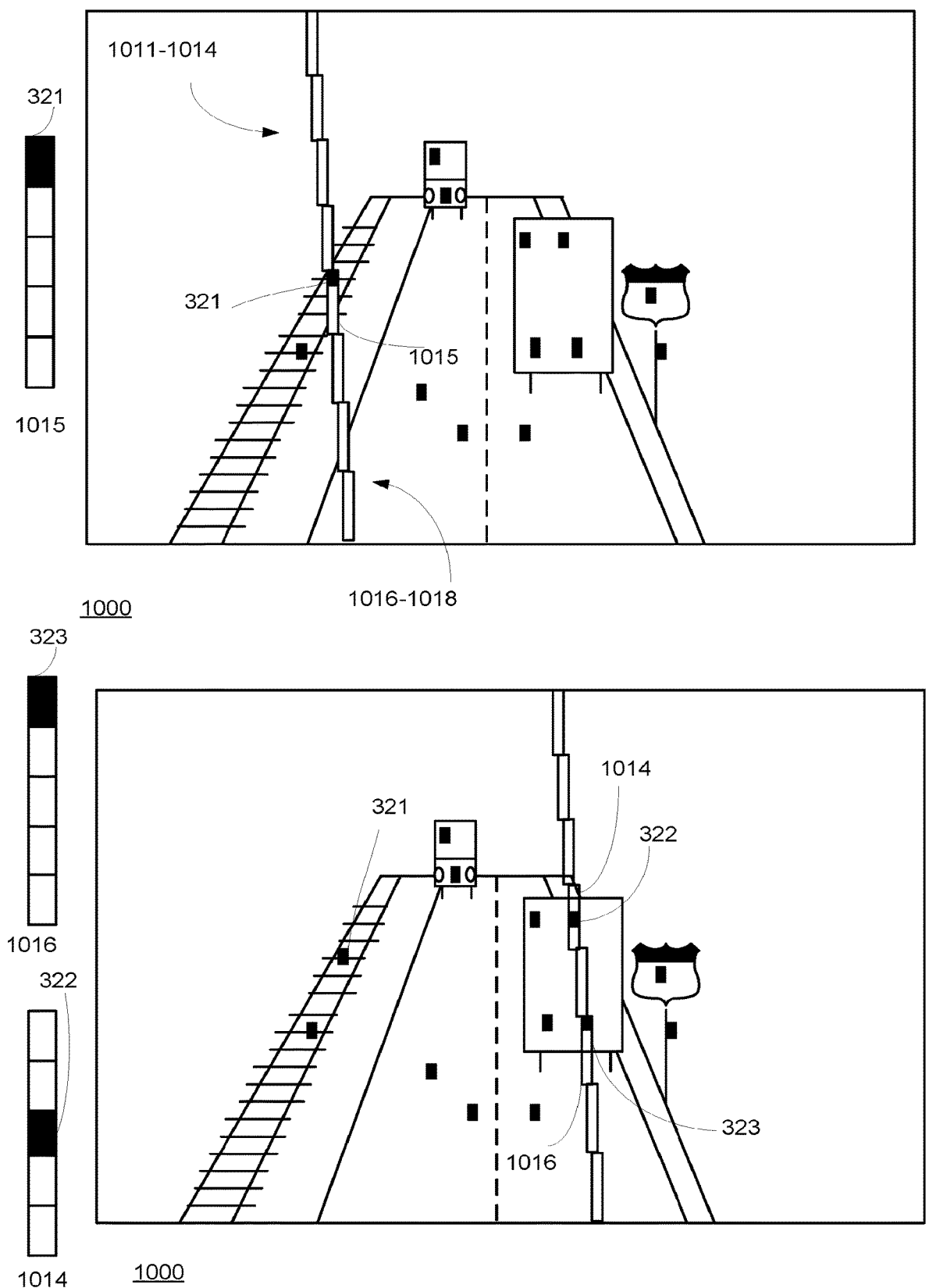
FIG. 13 illustrates a staggered array of temporary transmitter fields of view.

FIG. 13 illustrates a staggered array of temporary transmitter fields of view 1011-1018. The height of the staggered array may equal to the height of the image 1000.

The staggered array is scanned along the X-axis. The temporary transmitter fields of view 1011-1018 may overlap—although in FIG. 13 there is no overlap.

Each temporary transmitter field of view is virtually partitioned to segments. Each segment is associated with a single detector.

The upper part of FIG. 13 illustrates a first point in time during which target pixel 321 is included in the upper segment of temporary transmitter field of view 1015.

One or more light pulses reflected from target pixel 321 will be sent to the detector that is associated (by optical coupling) with the upper segment of temporary transmitter field of view 1015.

The lower part of FIG. 13 illustrates a second point in time during which target pixel 322 is included in a middle segment of temporary transmitter field of view 1014, and target pixel 323 is included in the upper segment of temporary transmitter field of view 1016.

One or more light pulses reflected from target pixel 322 will be sent to the detector that is associated (by optical coupling) with the middle segment of temporary transmitter field of view 1014.

One or more light pulses reflected from target pixel 323 will be sent to the detector that is associated (by optical coupling) with the upper segment of temporary transmitter field of view 1016.

In FIG. 13 it is assumed that there are five detectors and eight transmitters—for simplicity of explanation only. There may be any number of transmitters, detectors, and DMUs.

Figure 14:
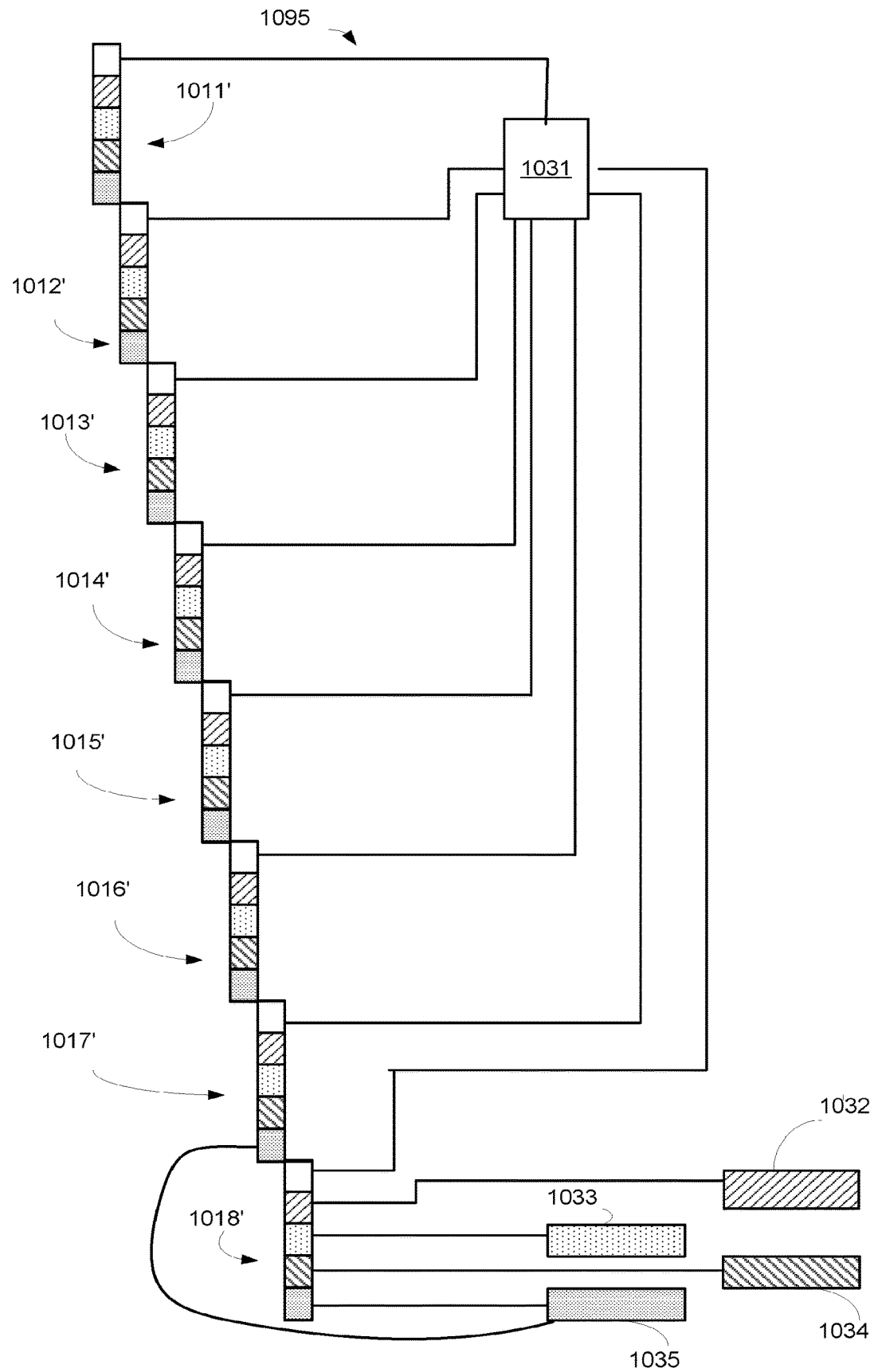
FIG. 14 illustrates an example of image plane sections associated with different transmitters, detectors and an optical multiplexer.

FIG. 14 illustrates an example of image plane sections associated with different transmitters, detectors, and also illustrates an optical multiplexer.

Multiple temporary fields of view of multiple transmitters are mapped to multiple image plane sections.

FIG. 14 illustrates eight temporary fields of view of multiple transmitters that are mapped to multiple image plane sections 1011'-1018'.

In FIG. 14 the optical multiplexer 1095 is configured to:
1) Map (optically couple) the top segment of each image plane section to first detector 1031.
2) Map (optically couple) the second segment of each image plane section to second detector 1032.
3) Map (optically couple) the third segment (middle segment) of each image plane section to third detector 1033.
4) Map (optically couple) the fourth segment of each image plane section to fourth detector 1034.
5) Map (optically couple) the bottom segment of each image plane section to fifth detector 1035.

Any mapping between segments and detectors may be provided.

FIG. 15 illustrates an example of image plane sections associated with different transmitters, detectors, and also illustrates an optical multiplexer.

In FIG. 15 the mapping of segments to detectors may differ from one image plane segment to another in a cyclic manner.

A detector may sum all the signals it receives from all the segments that are optically coupled to that detector. Knowing the time of transmission of the light pulses and the expected propagation delay (to the target object and from the target object)—the system knows which transmitter to associate with the reflected light pulses detected by any detector.

Figure 16:
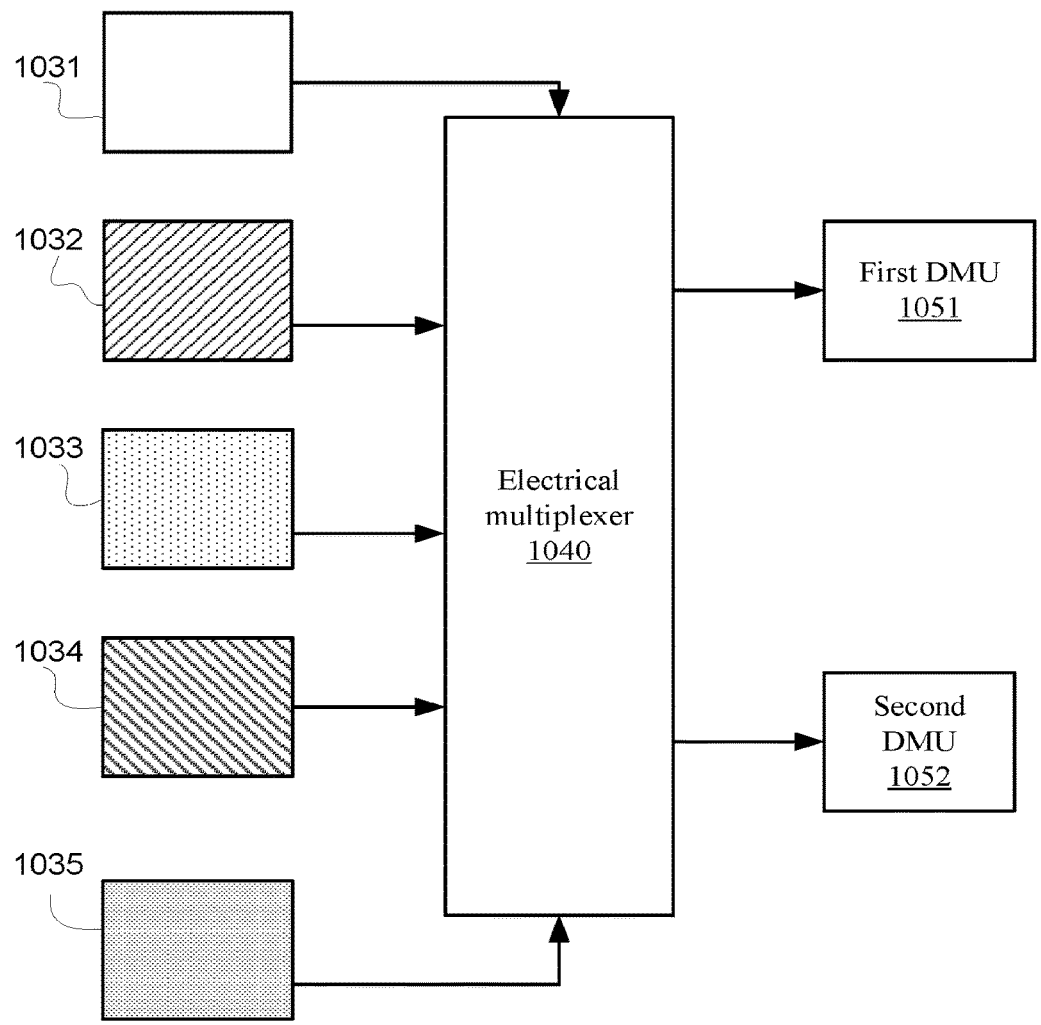
FIG. 16 is an example of detectors, an electrical multiplexer and two distance measurement units (DMUs)

FIG. 16 is an example of detectors, electrical multiplexer 1040 and two distance measurement units (DMUs) 1051 and 1052.

At any given time, the electrical multiplexer 1040 may determine which detector (out of 1031-1035) to couple to which DMU. If neither one of the detectors is expected to receive a reflected light pulse from a target object then the DMUs may be disconnected from the detectors.

For example—at the first point in time (upper part of FIG. 13) and assuming the mapping of FIG. 14—then first detector 1031 should be coupled to DMU 1051 or to DMU 1052.

Yet for another example—at the second point in time (lower part of FIG. 13) and assuming the mapping of FIG. 14—then first and third detectors 1031 and 1033 should be coupled to DMUs 1051 and 1052. Each DMU is electrically coupled to a single detector.

Figure 17:
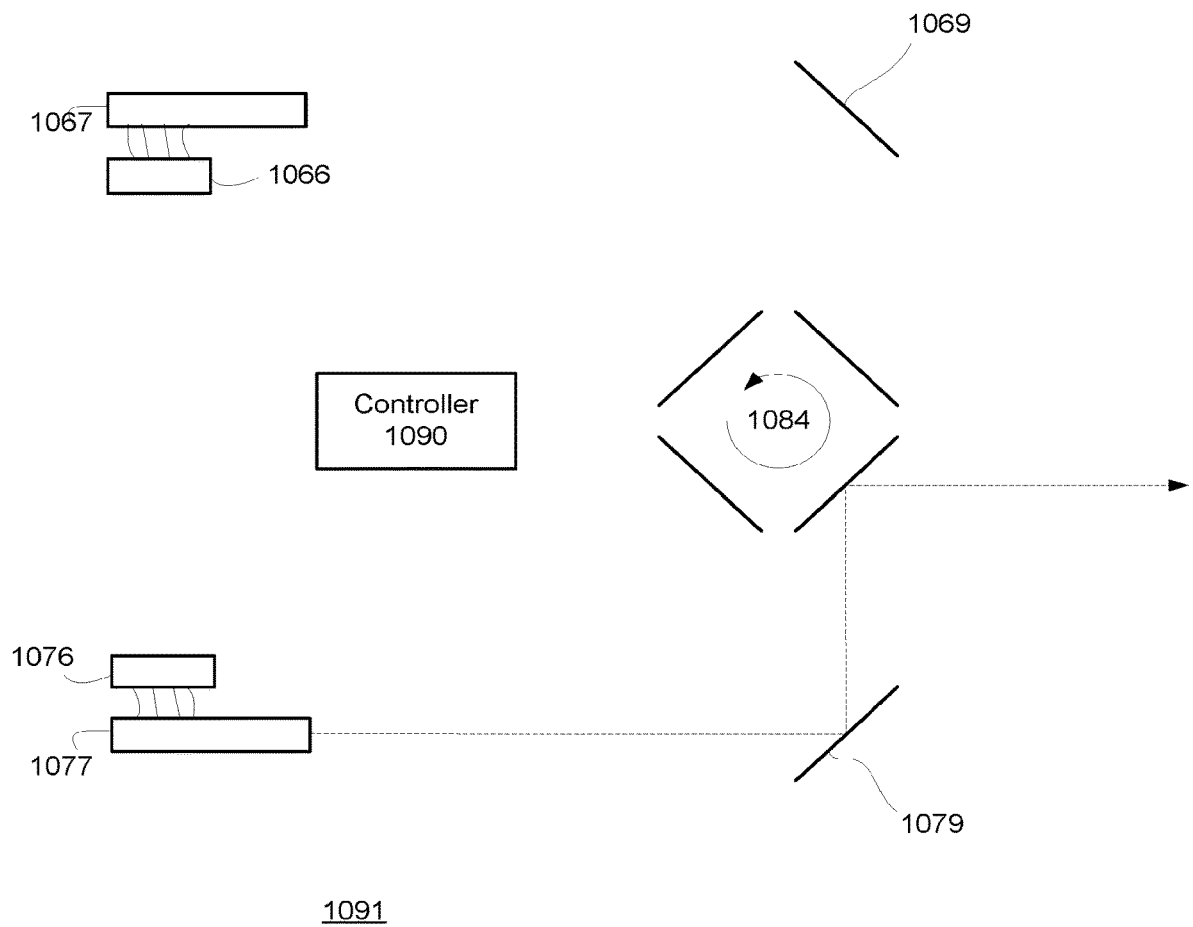
FIGS. 17 and 18 illustrate examples of a transmission module.
Figure 18:
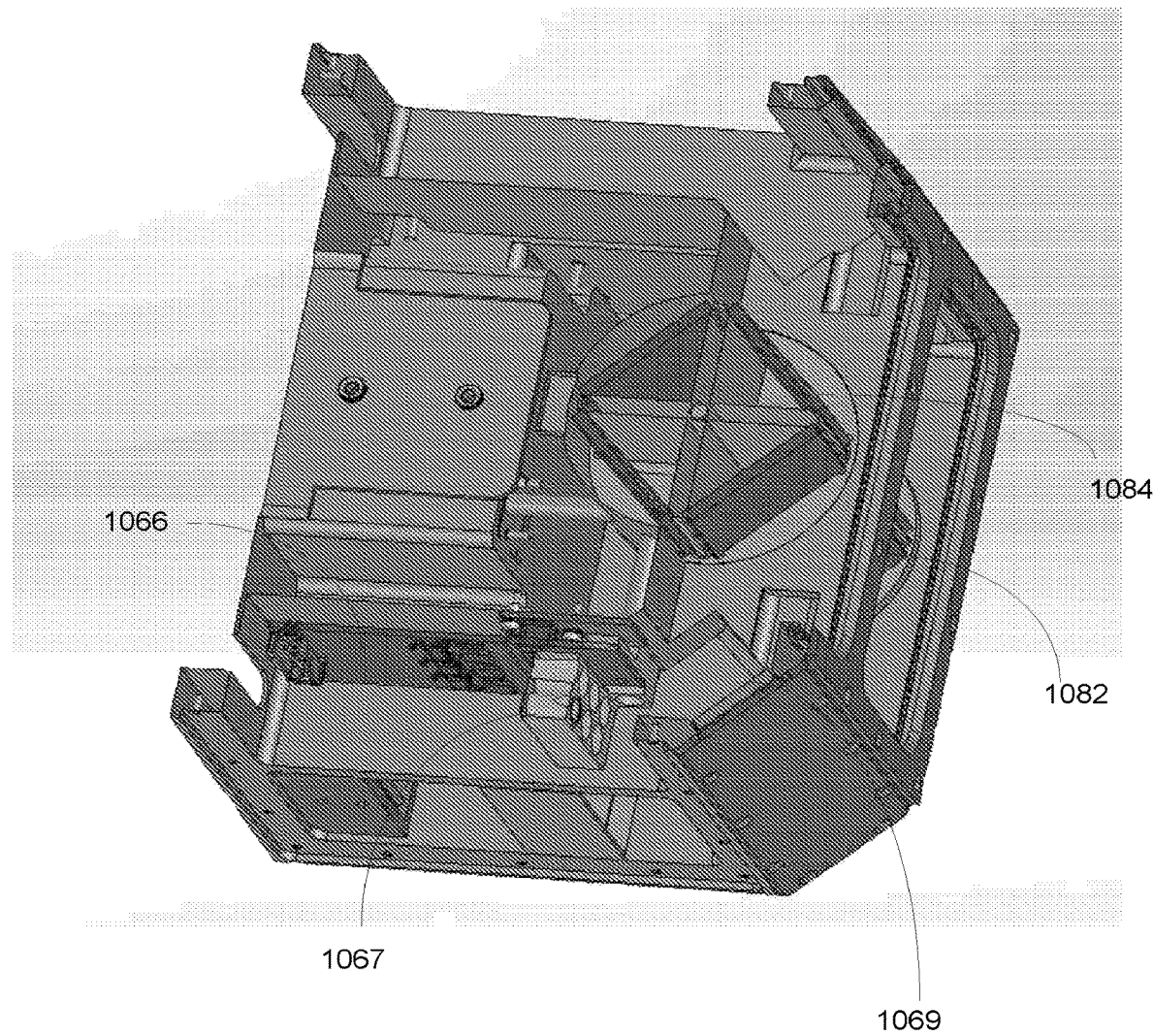

FIGS. 17 and 18 illustrates examples of transmission module 1091.

Figure 19:
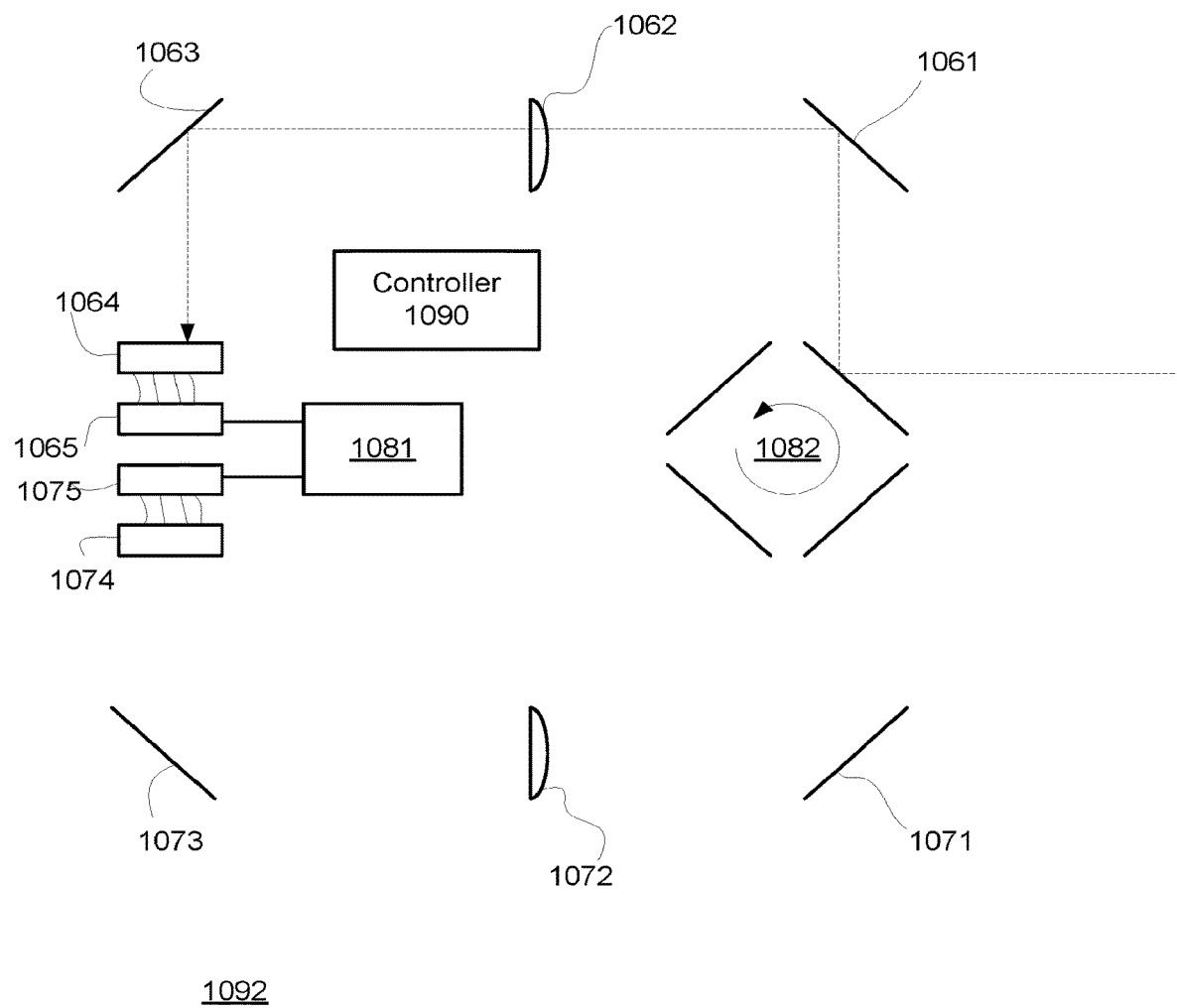
FIGS. 19 and 20 illustrate examples of a reception module.
Figure 20:
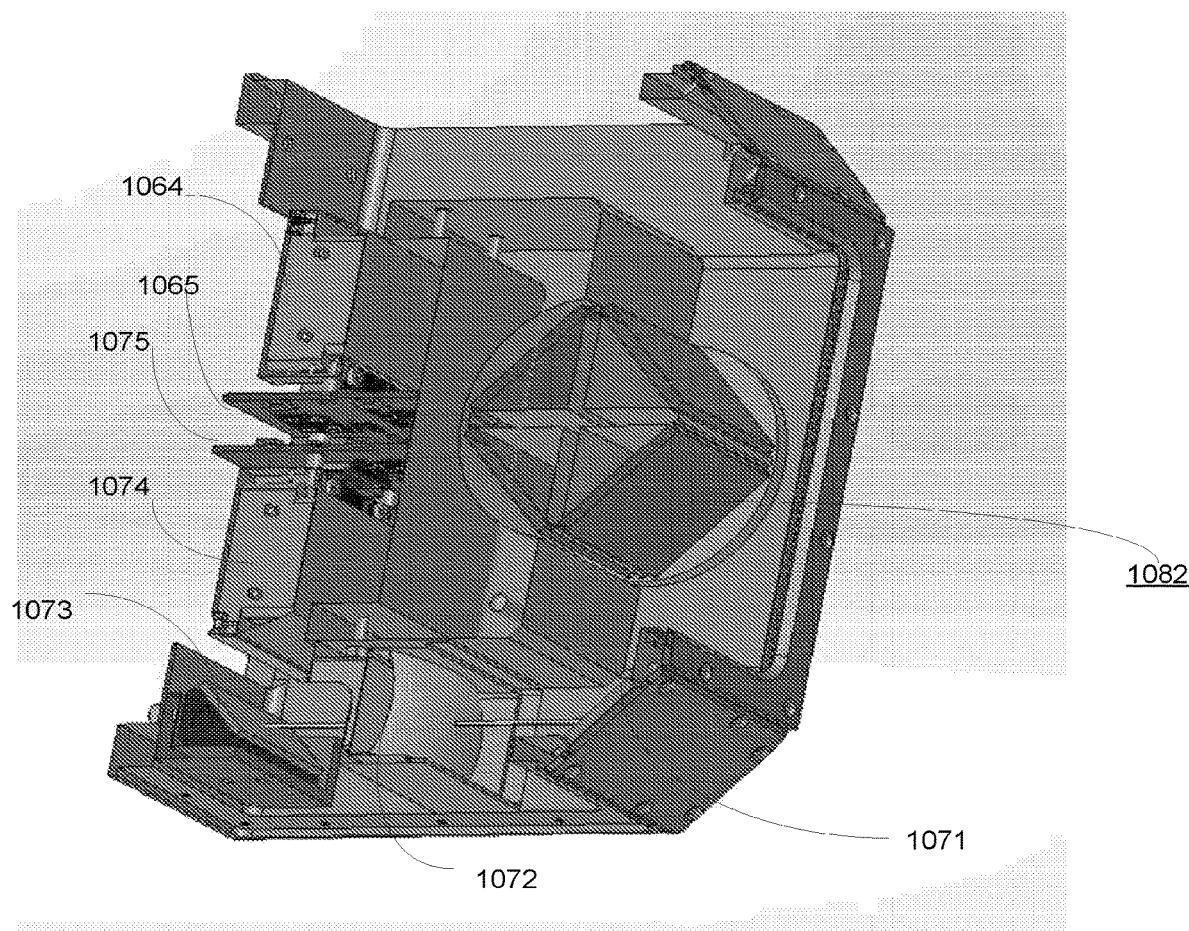

FIGS. 19 and 20 illustrates examples of reception module 1092.

Figure 21:
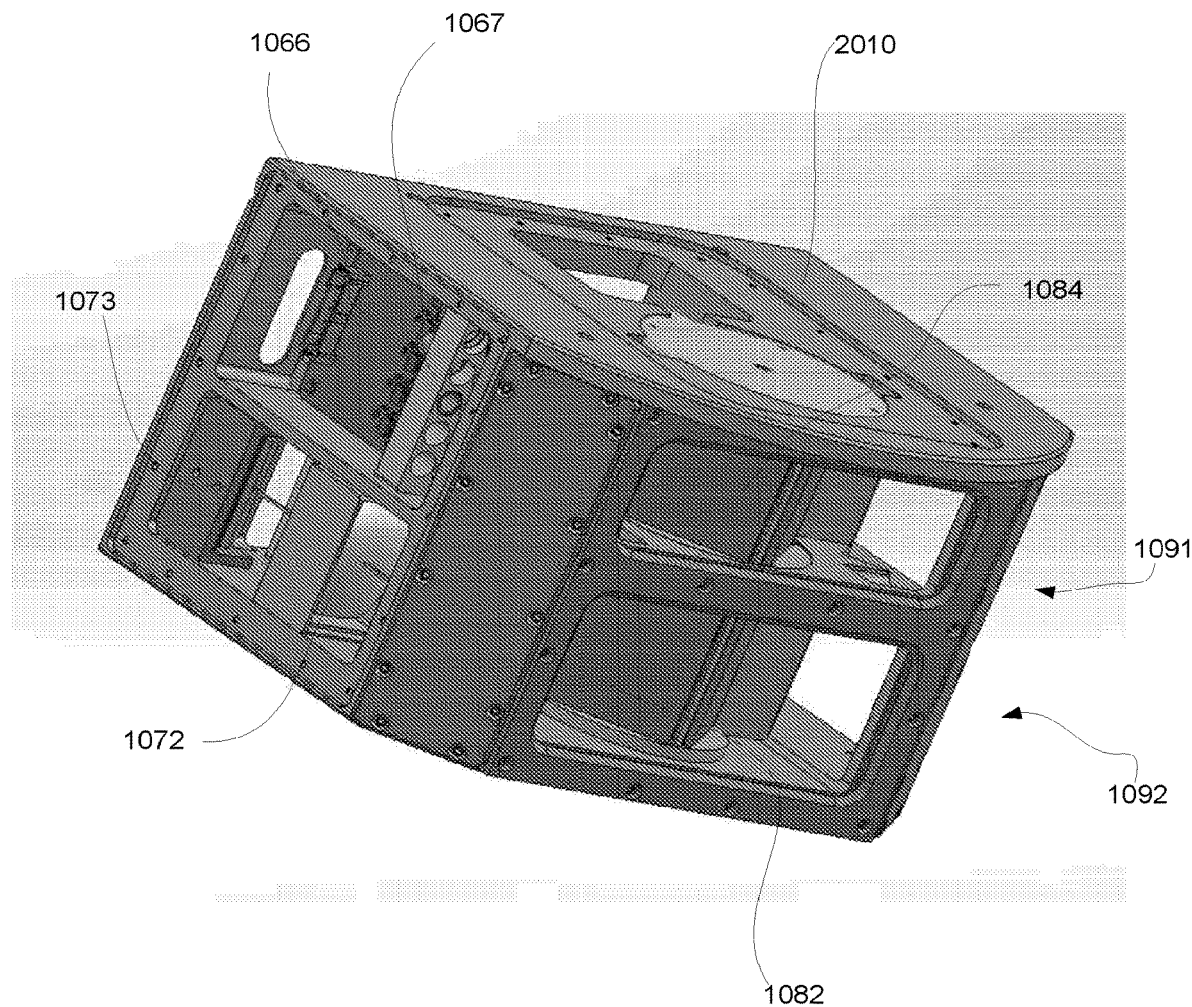
FIGS. 21 and 22 illustrate examples of a system that includes a frame, a transmission module, and a reception module.
Figure 22:
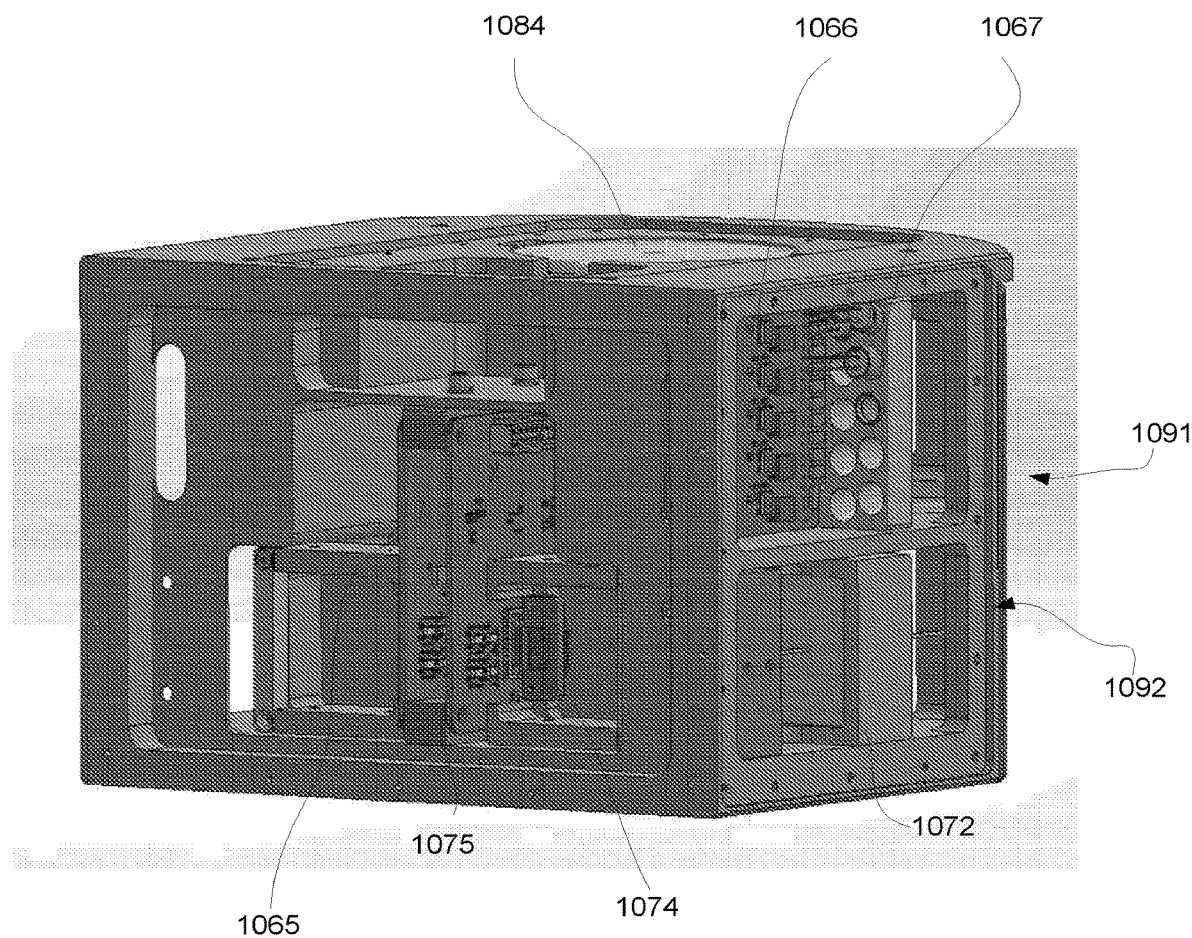

FIGS. 21 and 22 illustrates examples of a system 2000 that includes a frame 2010, transmission module 1091 and reception module 1092.

The transmission module 1091 includes:
1) First and second transmitter arrays 1067 and 1077. These arrays are positioned on both sides of the transmission scanner 1084. There may be any spatial relationship between the temporary transmitter fields of views. For example—the temporary transmitter fields of views of the first and second transmitter arrays may be interlaced.
2) First and second driving circuits 1066 and 1076 for driving the first and second transmitter arrays 1067 and 1077.
3) Controller 1090 for controlling transmission module 1091.
4) Deflectors 1069 and 1079 for deflecting light pulses from the transmitters towards the transmission module.
5) Transmission scanner 1084 that includes multiple facets and rotates about its axis to mechanically scan light pulses from one or more transmitters along the X-axis.

The transmission scanner 1084 is configured to rotate and direct light pulses from the reflectors towards the target objects.

FIG. 18 illustrates the transmission module 1091 as positioned directly above the reception module 1092. Other arrangements may be provided. FIG. 18 also illustrates reception scanner 1082.

FIGS. 19 and 20 illustrates examples of reception module 1092.

The reception module 1092 includes:
1) First and second detector arrays 1065 and 1075. These arrays are positioned on both sides of the reception scanner 1082. There may be any spatial relationship between the temporary receiver fields of views. For example—the temporary receiver fields of views of the first and second receiver arrays may be interlaced.
2) First and second electrical units that may include one or more electrical multiplexers.
3) DMU 1081.
4) Controller 1090 for controlling reception module 1092.
5) Deflectors 1061 and 1071 for deflecting light pulses from the reception scanner towards lenses 1062 and 1072 and then towards deflectors 1063 and 1073 that deflect light from lenses 1062 and 1072 towards first and second detector arrays 1065 and 1075.
6) Reception scanner 1084 that includes multiple facets and rotates about its axis to receive reflected light pulses from various directions and to direct the reflected light pulses to deflectors 1061 and 1071.

Reception scanner and transmission scanner may be mechanical scanners in a sense that the perform a mechanical movement in order to scan light pulses.

Figure 23:
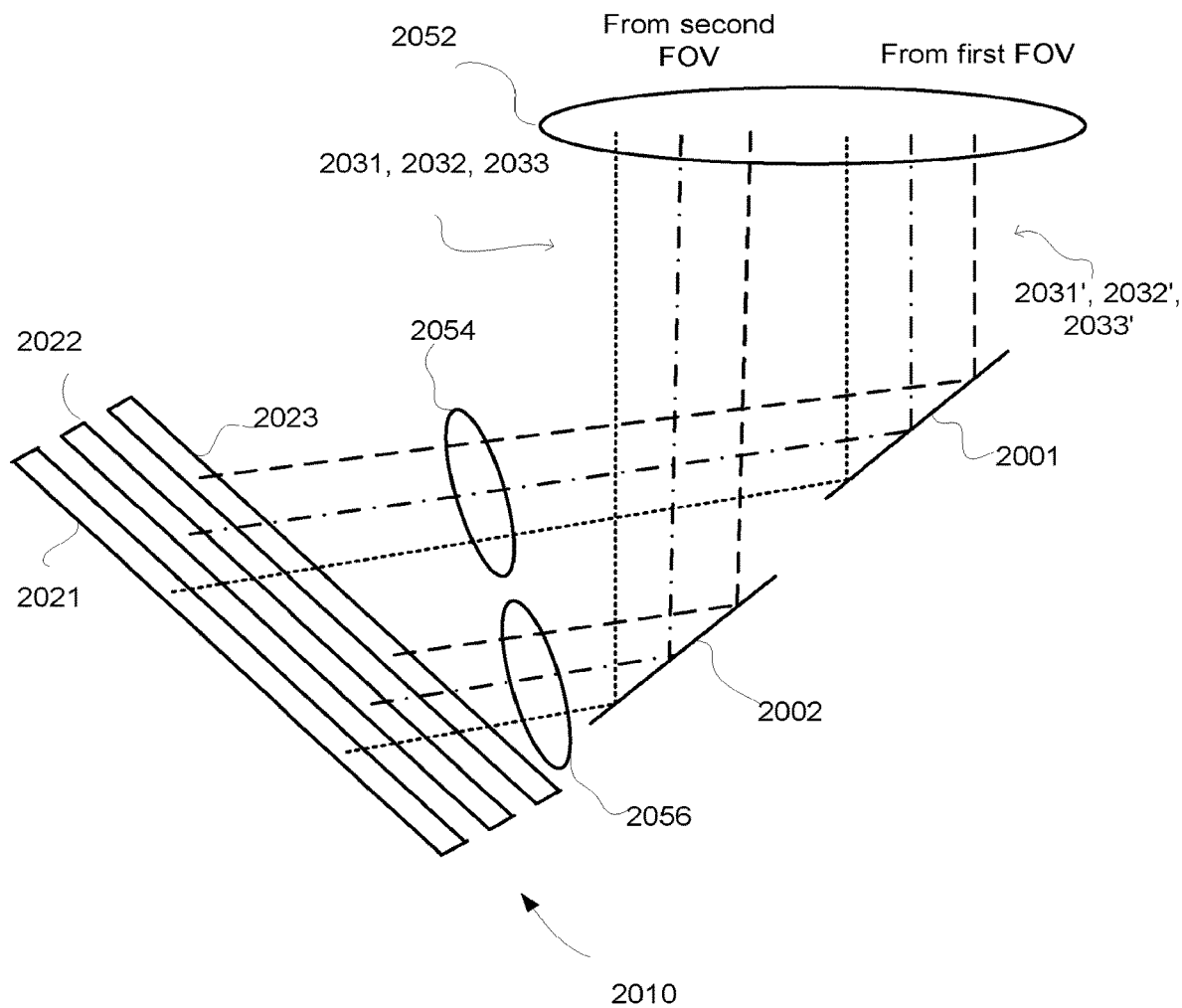
FIG. 23 illustrates an example of image plane sections associated with different transmitters and detectors.
Figure 24:
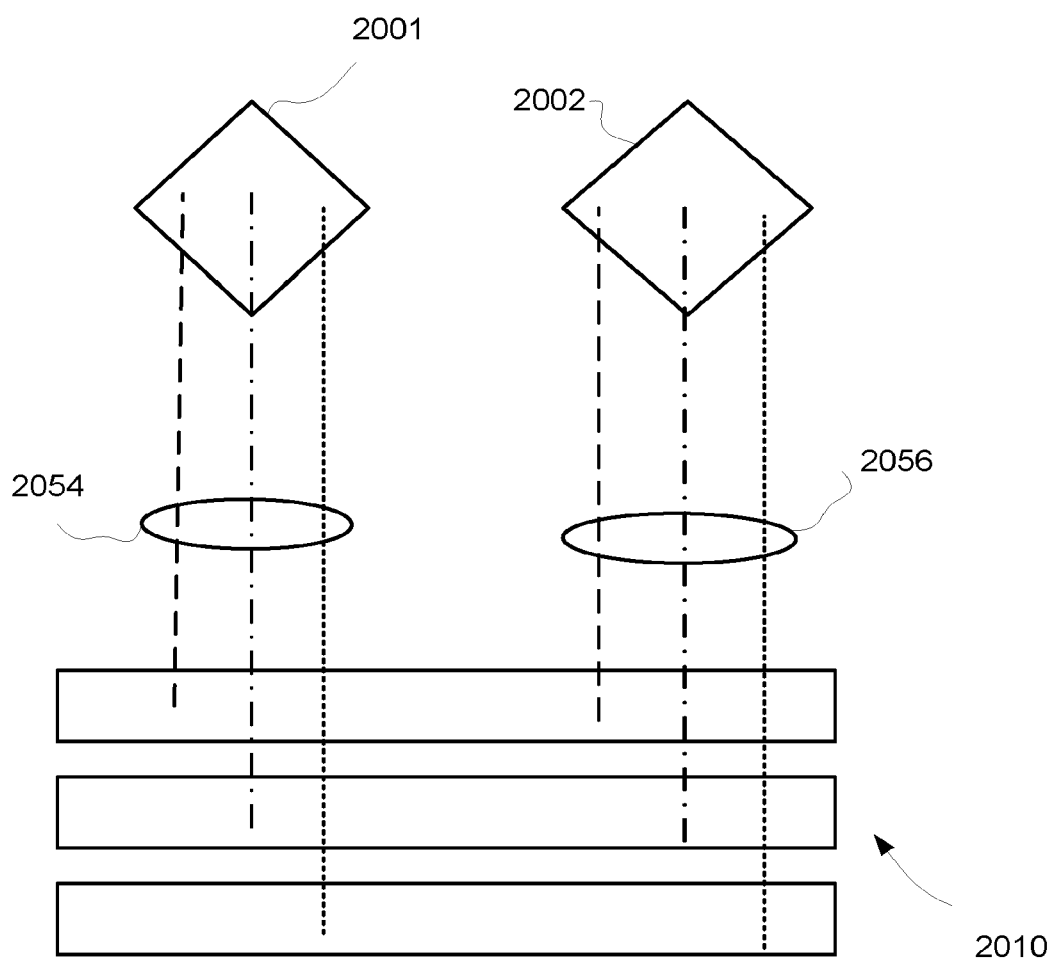
FIG. 24 illustrates an example of image plane sections associated with different transmitters and detectors.

FIGS. 23 and 24 illustrate different segments of two field of view of two transmitters—(a) three first reflected radiation rays (2031', 2032' and 2033')—that are reflected from radiation emitted by a first transmitter, and (b) three second reflected radiation rays (2031, 2032 and 2033) that are reflected from radiation emitted by a second transmitter.

The first three reflected radiation rays pass through lens 2052 and are further reflected, by first mirror 2001 towards lens 2054 and from lens 2054 towards first segments of three parallel detectors 2012, 2022 and 2023—each of the detector receives a different radiation ray (a different segment).

The second three reflected radiation rays pass through lens 2052 are further reflected, by second mirror 2002 towards lens 2056 and from lens 2056 towards second segments of three parallel detectors 2012, 2022 and 2023 (or detection unit 2010)—each of the detector receives a different radiation ray (a different segment).

The number of radiation rays per field of view may exceed three (thus more than three segments per FOV).

The mirrors and the detectors may act as an optical multiplexer.

The first and second mirrors may be preceded by optics—such as collimating lens, one or more mirrors or any other optical element.

Any reference to any of the terms "comprise", "comprises", "comprising" "including", "may include" and "includes" may be applied to any of the terms "consists", "consisting", "and consisting essentially of". For example—any of method describing steps may include more steps than those illustrated in the figure, only the steps illustrated in the figure or substantially only the steps illustrate in the figure. The same applies to components of a device, processor or system and to instructions stored in any non-transitory computer readable storage medium.

Any reference to "may be" refers to a condition that may or may not be fulfilled. The specification covers both options.

The invention may also be implemented in a computer program for running on a computer system, at least including code portions for performing steps of a method according to the invention when run on a programmable apparatus, such as a computer system or enabling a programmable apparatus to perform functions of a device or system according to the invention. The computer program may cause the storage system to allocate disk drives to disk drive groups.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on a non-transitory computer readable medium. All or some of the computer program may be provided on computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as flash memory, EEPROM, EPROM, ROM; ferromagnetic digital memories; MRAM; volatile storage media including registers, buffers or caches, main memory, RAM, etc.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/output (I/O) devices. When executing the computer program, the computer system processes information according to the computer program and produces resultant output information via I/O devices.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Although specific conductivity types or polarity of potentials have been described in the examples, it will be appreciated that conductivity types and polarities of potentials may be reversed.

Each signal described herein may be designed as positive or negative logic. In the case of a negative logic signal, the signal is active low where the logically true state corresponds to a logic level zero. In the case of a positive logic signal, the signal is active high where the logically true state corresponds to a logic level one. Note that any of the signals described herein may be designed as either negative or positive logic signals. Therefore, in alternate embodiments, those signals described as positive logic signals may be implemented as negative logic signals, and those signals described as negative logic signals may be implemented as positive logic signals.

Furthermore, the terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporary or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

We claim:

1. A method for performing active distance measurements, the method comprising:
receiving or generating an identification of at least one target object recognized in an image;
emitting, by a transmission module having multiple transmitters, one or more light pulses towards the at least one target object;
directing, by a first multiplexer of a reception module, towards at least one detector, at least one reflected light pulse that is reflected from the at least one target object;
detecting, by at least one detector of the reception module, the at least one reflected light pulse;

dynamically coupling, by a second multiplexer, the at least one detector to at least one distance measurement unit;

calculating, by the one or more distance measurement units, a distance to each one of the at least one target object based on the at least one emitted light pulse and the at least one reflected light pulse; wherein a given light pulse is directed towards a given location of a given target object;

selecting a transmitter of the transmission module based on a first axis coordinate of the given location; and selecting a timing of transmission of the given light pulse based on a scanning pattern of a transmission scanner and a second axis coordinate of the given location.

2. The method according to claim 1, wherein the at least one detector belongs to multiple detectors of a reception module;

wherein the at least one distance measurement unit belongs to multiple distance measurement units of the reception module;

and wherein a number of detectors exceeds a number of distance measurement units.

3. The method according to claim 1, comprising mechanically scanning the image along a first direction, and electrically scanning the image along a second direction.

4. The method according to claim 1 comprising deflecting, by the transmission scanner, the at least one or more light pulses towards the at least one target object.

5. The method according to claim 1, wherein the first multiplexer comprises an optical multiplexer and the second multiplexer comprises an electrical multiplexer, the method further comprising setting, by a controller, the electrical multiplexer, the optical multiplexer, and the multiple transmitters of the transmission module; wherein the setting is based on at least one location of the at least one target object.

6. The method according to claim 1, comprising emitting a light pulse by a transmitter of the transmission module only when the light pulse is directed towards the at least one target object.

7. The method according to claim 1, wherein the emitting comprises moving the transmission scanner while maintaining the multiple transmitters of the transmission module static.

8. The method according to claim 1, wherein the multiple transmitters of the transmission module are associated with multiple temporary fields of view that differ from each other; wherein the method comprises directing, by the first multiplexer and to the at least one detector, reflected light pulses associated with a segment of at least one transmitter field of view.

9. The method according to claim 8 wherein the directing comprises directing different segments of a temporary field of view to different detectors.

10. The method according to claim 9, comprising directing, by the first multiplexer and to each detector of multiple detectors, reflected light pulses associated with a segment of each temporary field of view.

11. The method according to claim 9 wherein the multiple temporary fields of view form a staggered array of temporary fields of view.

12. The method according to claim 1 wherein multiple temporary fields of view of the multiple transmitters are mapped to multiple image plane sections; wherein the method comprises optically coupling a single segment of each image plane section to a single detector.

13. The method according to claim 12 comprising emitting the at least one light pulse without concurrent emissions from two or more transmitters of the multiple transmitters.

14. The method according to claim 1 wherein the dynamically coupling of the at least one detector to at least one distance measurement unit comprises coupling, at any given point of time, up to a single detector to a single distance measurement unit.

15. A system for performing active distance measurements, the system comprising:

a transmission module having multiple transmitters that is arranged to emit one or more light pulses towards at least one target object that was recognized in an image;

a reception module that comprises a first multiplexer and at least one detector; wherein the first multiplexer is arranged to direct towards at least one detector, at least one reflected light pulse that is reflected from the at least one target object;

wherein the at least one detector is arranged to detect the at least one reflected light pulse;

a second multiplexer that is arranged to dynamically couple the at least one detector to at least one distance measurement unit; and one or more distance measurement units that are arranged to calculate a distance to each one of the at least one target object based on the at least one emitted light pulse and the at least one reflected light pulse;

wherein the system is configured to:

direct a given light pulse towards a given location of a given target object;

select a transmitter of the transmission module based on a first axis coordinate of the given location; and select a timing of transmission of the given light pulse based on a scanning pattern of a transmission scanner and a second axis coordinate of the given location.

16. The system according to claim 15, wherein the at least one detector belongs to multiple detectors of the reception module;

wherein the at least one distance measurement unit belongs to multiple distance measurement units of the reception module; and wherein a number of detectors exceeds a number of distance measurement units.

17. The system according to claim 15, wherein the transmission module is arranged to mechanically scan the image along a first direction, and electrically scan the image along a second direction.

18. A method for performing active distance measurements, the method comprising:

receiving or generating an identification of at least one target object recognized in an image;

emitting, by a transmission module having multiple transmitters, one or more light pulses towards the at least one target object;

directing, by a first multiplexer of a reception module, towards at least one detector, at least one reflected light pulse that is reflected from the at least one target object;

detecting, by at least one detector of the reception module, the at least one reflected light pulse;

dynamically coupling, by a second multiplexer, the at least one detector to at least one distance measurement unit; and calculating, by the one or more distance measurement units, a distance to each one of the at least one target object based on the at least one emitted light pulse and the at least one reflected light pulse, wherein the emitting comprises moving a transmission scanner while maintaining the multiple transmitters of the transmission module static.

19. The method according to claim 18, wherein the at least one detector belongs to multiple detectors of a reception module;
wherein the at least one distance measurement unit belongs to multiple distance measurement units of the reception module; and
wherein a number of detectors exceeds a number of distance measurement units.

20. The method according to claim 18, comprising mechanically scanning the image along a first direction, and electrically scanning the image along a second direction.

21. The method according to claim 18 comprising deflecting, by the transmission scanner, the at least one or more light pulses towards the at least one target object.

22. The method according to claim 18, wherein the first multiplexer comprises an optical multiplexer and the second multiplexer comprises an electrical multiplexer, the method further comprising setting, by a controller, the electrical multiplexer, the optical multiplexer, and the multiple transmitters of the transmission module; wherein the setting is based on at least one location of the at least one target object.

23. The method according to claim 18, comprising emitting a light pulse by a transmitter of the transmission module only when the light pulse is directed towards the at least one target object.

24. The method according to claim 18, wherein the multiple transmitters of the transmission module are associated with multiple temporary fields of view that differ from each other; wherein the method comprises directing, by the first multiplexer and to the at least one detector, reflected light pulses associated with a segment of at least one transmitter field of view.

25. The method according to claim 24, wherein the directing comprises directing different segments of a temporary field of view to different detectors.

26. The method according to claim 25, comprising directing, by the first multiplexer and to each detector of multiple detectors, reflected light pulses associated with a segment of each temporary field of view.

27. The method according to claim 25, wherein the multiple temporary fields of view form a staggered array of temporary fields of view.

28. The method according to claim 18, wherein multiple temporary fields of view of the multiple transmitters are mapped to multiple image plane sections; wherein the method comprises optically coupling a single segment of each image plane section to a single detector.

29. A method for performing active distance measurements, the method comprising:
receiving or generating an identification of at least one target object recognized in an image;
emitting, by a transmission module having multiple transmitters, one or more light pulses towards the at least one target object;
directing, by a first multiplexer of a reception module, towards at least one detector, at least one reflected light pulse that is reflected from the at least one target object;
detecting, by at least one detector of the reception module, the at least one reflected light pulse;
dynamically coupling, by a second multiplexer, the at least one detector to at least one distance measurement unit; and
calculating, by the one or more distance measurement units, a distance to each one of the at least one target object based on the at least one emitted light pulse and the at least one reflected light pulse; wherein the multiple transmitters of the transmission module are associated with multiple temporary fields of view that differ from each other; wherein the method comprises directing, by the first multiplexer and to the at least one detector, reflected light pulses associated with a segment of at least one transmitter field of view.

30. The method according to claim 29, wherein the at least one detector belongs to multiple detectors of a reception module;
wherein the at least one distance measurement unit belongs to multiple distance measurement units of the reception module; and
wherein a number of detectors exceeds a number of distance measurement units.

31. The method according to claim 29, comprising mechanically scanning the image along a first direction, and electrically scanning the image along a second direction.

32. The method according to claim 29, comprising deflecting, by a transmission scanner, the at least one or more light pulses towards the at least one target object.

33. The method according to claim 29, wherein the first multiplexer comprises an optical multiplexer and the second multiplexer comprises an electrical multiplexer, the method further comprising setting, by a controller, the electrical multiplexer, the optical multiplexer, and the multiple transmitters of the transmission module; wherein the setting is based on at least one location of the at least one target object.

34. The method according to claim 29 wherein multiple temporary fields of view of the multiple transmitters are mapped to multiple image plane sections; wherein the method comprises optically coupling a single segment of each image plane section to a single detector.

35. The method according to claim 29 wherein the dynamically coupling of the at least one detector to at least one distance measurement unit comprises coupling, at any given point of time, up to a single detector to a single distance measurement unit.

36. A method for performing active distance measurements, the method comprising:
receiving or generating an identification of at least one target object recognized in an image;
emitting, by a transmission module having multiple transmitters, one or more light pulses towards the at least one target object;
directing, by a first multiplexer of a reception module, towards at least one detector, at least one reflected light pulse that is reflected from the at least one target object;
detecting, by at least one detector of the reception module, the at least one reflected light pulse;
dynamically coupling, by a second multiplexer, the at least one detector to at least one distance measurement unit; and
calculating, by the one or more distance measurement units, a distance to each one of the at least one target object based on the at least one emitted light pulse and the at least one reflected light pulse;
wherein multiple temporary fields of view of the multiple transmitters are mapped to multiple image plane sections; wherein the method comprises optically coupling a single segment of each image plane section to a single detector.

37. A system for performing active distance measurements, the system comprises:
a transmission module that is arranged to emit one or more light pulses towards at least one target object that was recognized in an image, the transmission module comprising a transmission scanner and multiple transmitters, wherein the transmission scanner is configured to move while maintaining the multiple transmitters of the transmission module static;

a reception module that comprises a first multiplexer and at least one detector; wherein the first multiplexer is arranged to direct towards at least one detector, at least one reflected light pulse that is reflected from the at least one target object;

wherein the at least one detector is arranged to detect the at least one reflected light pulse;

a second multiplexer that is arranged to dynamically couple the at least one detector to at least one distance measurement unit; and one or more distance measurement units that are arranged to calculate a distance to each one of the at least one target object based on the at least one emitted light pulse and the at least one reflected light pulse.

38. A system for performing active distance measurements, the system comprises:

a transmission module that is arranged to emit one or more light pulses towards at least one target object that was recognized in an image, the transmission module comprising multiple transmitters;

a reception module that comprises a first multiplexer and at least one detector; wherein the first multiplexer is arranged to direct towards at least one detector, at least one reflected light pulse that is reflected from the at least one target object;

wherein the at least one detector is arranged to detect the at least one reflected light pulse;

a second multiplexer that is arranged to dynamically couple the at least one detector to at least one distance measurement unit; and one or more distance measurement units that are arranged to calculate a distance to each one of the at least one target object based on the at least one emitted light pulse and the at least one reflected light pulse;

wherein the multiple transmitters of the transmission module are associated with multiple temporary fields of view that differ from each other; and wherein the first multiplexer is configured to direct reflected light pulses associated with a segment of at least one transmitter field of view to the at least one detector.

39. A system for performing active distance measurements, the system comprises:

a transmission module that is arranged to emit one or more light pulses towards at least one target object that was recognized in an image, the transmission module comprising multiple transmitters;

a reception module that comprises a first multiplexer and at least one detector; wherein the first multiplexer is arranged to direct towards at least one detector, at least one reflected light pulse that is reflected from the at least one target object;

wherein the at least one detector is arranged to detect the at least one reflected light pulse;

a second multiplexer that is arranged to dynamically couple the at least one detector to at least one distance measurement unit; and one or more distance measurement units that are arranged to calculate a distance to each one of the at least one target object based on the at least one emitted light pulse and the at least one reflected light pulse;

wherein multiple temporary fields of view of the multiple transmitters are mapped to multiple image plane sections; wherein a single segment of each image plane section is optically coupled to a single detector.

* * * * *